(12) United States Patent
Graves

(10) Patent No.: US 6,882,800 B1
(45) Date of Patent: Apr. 19, 2005

(54) OPTICAL SWITCHING SYSTEM FOR SWITCHING OPTICALS SIGNALS IN WAVELENGTH GROUPS

(75) Inventor: Alan F. Graves, Kanata (CA)

(73) Assignee: Nortel Networks Limited, St-Laurent (CA)

(*) Notice: Subject to any disclaimer, the term of this patent is extended or adjusted under 35 U.S.C. 154(b) by 668 days.

(21) Appl. No.: 09/703,631

(22) Filed: Nov. 2, 2000

(51) Int. Cl.[7] ............................................... H04J 14/00
(52) U.S. Cl. ............................ 398/46; 398/50; 398/56
(58) Field of Search .......................... 398/46, 48, 50, 398/56; 385/16, 17; 359/320

(56) References Cited

U.S. PATENT DOCUMENTS 5,457,556 A * 10/1995 Shiragaki ...................... 398/50
6,192,172 B1 * 2/2001 Fatehi et al. ................... 385/17
6,341,040 B1 * 1/2002 Tai et al. ...................... 359/584

FOREIGN PATENT DOCUMENTS

EP            1030481 A1 * 8/2000 ............ H04J/14/02

OTHER PUBLICATIONS

H. Kuwano, "MEMS for Telecommunication Systems", Seventh International Symposium on Micro Machine and Human Science, IEEE 1996.*

C. Marxer, "MEMS for Applications in Fiber Optic Communication", IEEE 1998.*

* cited by examiner

Primary Examiner—Jason Chan
Assistant Examiner—Shi K. Li

(57) ABSTRACT

An optical switching system includes multiple layers for switching optical signals. A first layer is for switching optical channels. A second layer is for switching groups of optical channels. A third layer is for switching composite optical signals. Between layers demultiplexing and multiplexing of signals allows switching within a single switch core at any level from fiber to wavelength group to optical wavelengths. Optical amplifiers between layers compensate for losses within the switch and within demultiplexers and multiplexers. One configuration provided additional multiplexing and demultiplexing to allow direct connection between the first and third layers. Another configuration shares optical switching matrices between the first and third layers.

35 Claims, 17 Drawing Sheets

US 6,882,800 B1

OPTICAL SWITCHING SYSTEM FOR SWITCHING OPTICALS SIGNALS IN WAVELENGTH GROUPS

CROSS-REFERENCE TO RELATED APPLICATIONS

The present application is related in subject matter to U.S. application Ser. No. 09/511,065, entitled "Switch For Optical Signals", now U.S. Pat. No. 6,606,427, assigned to the Assignee of the present invention and hereby incorporated by reference herein in its entirety. The present application is also related in subject matter to U.S. application Ser. No. 09/593,697 entitled "Optical Switching Device", now U.S. Pat. No. 6,366,716, assigned to the Assignee of the present invention and hereby incorporated by reference herein in its entirety.

FIELD OF THE INVENTION

The present invention relates generally to systems for switching optical signals and more particularly to systems capable of switching optical signals in groups, according to the wavelength of the signals.

BACKGROUND OF THE INVENTION

Dense Wavelength Division Multiplexing (DWDM) of optical signals is a technique used to carry many optical signals on a single optical fiber. In DWDM systems, the transmission spectrum, for example 1520 nm to 1550 nm, is divided into many channel wavelengths with adequate spacing left between each channel wavelength to allow for separation of the DWDM signal into its constituent channel wavelengths, also referred to as lambdas, in a demultiplexer, feeding an array of receivers. Each optical signal in the DWDM signal has a unique wavelength representing a particular frequency, which has been assigned to the carrier signal of that channel, the carrier signal having been modulated at a high bit-rate, for example 10 Gb/s, by data to be transmitted on that channel wavelength. This creates optical sidebands above and below the carrier frequency. These determine the densest practical spacing in a WDM system since they must not overlap. As improvements in DWDM related techniques are made, for example improvements in modulation of carrier signals and demultiplexing of DWDM signals into their constituent optical signals, it is feasible that more optical signals, each of a higher bit-rate, will be carried on a single fiber. For example, systems are currently envisioned that will transmit up to 160 channel wavelengths, each carrying up to 10 Gb/s of data, on a single fiber. As these advances are made, switches for switching the DWDM signals will be required to switch a larger number of optical signals both with a granularity of an individual wavelength and as groups of wavelengths, resulting in larger and more complex switch architectures.

In view of the above, there is a need for an optical switching system that addresses the switching requirements of improved DWDM techniques described above.

SUMMARY OF THE INVENTION

It is an object of the present invention to provide an improved optical switching system for switching optical signals in various granularities.

Accordingly, the optical switching system provides a flexible method of switching wavelengths and/or wavelength groups on a provisionable basis.

Conveniently optical wavelengths may be referred to as lambdas and groups of optical wavelengths as lambda groups.

According to an aspect of the present invention there is provided an optical switching system for switching optical signals in wavelength groups, the system comprising:
a first optical switching matrix having multiple inputs and multiple outputs and being operable to switch a composite optical signal composed of a plurality of optical channel signals from any one of a plurality of the inputs to any one of a plurality of the outputs;
at least one wavelength division demultiplexer (WDD) coupled at its input to an output of the first optical switching matrix for dividing a composite optical signal into groups of optical channel signals;
a plurality of optical switching matrices each matrix having multiple outputs and multiple inputs at least one of which is coupled to a respective output of the wavelength division demultiplexer, each matrix being operable to switch a group of optical channel signals from any one of a plurality of the inputs to any one of a plurality of the outputs; and
at least one wavelength division multiplexer (WDM) coupled at each of its inputs to an output of a respective one of the plurality of optical switching matrices and coupled at its output to one of the inputs of the first optical switching matrix.

An advantage of embodiments of the invention is that they provide optical channel signal switching in groups of signals, thereby allowing more signals to be switched with a smaller and less complex switch and allowing bandwidth to be provisioned or service to be provided in capacity blocks either matching an individual wavelength or the aggregate capacity of groups of wavelengths. Furthermore, in these network nodes and for these wavelength groups, this results in a lower level of impairment, both in terms of optical power loss in the WDM, WDD and in terms of group delay distortion in the WDM/WDD, thereby allowing for a longer reach system. These embodiments could be useful in the core of an optical network, for example, where coarse switching, at the wavelength group or band level is adequate.

Embodiments of the invention may further include in one or more of the plurality of optical switching matrices at least one input for adding a group of optical channel signals to the optical switching matrix. In addition, or alternatively, one or more of the plurality of optical switching matrices may further include at least one output for dropping a group of optical signals from the optical switching matrix. This feature provides add/drop functionality at the wavelength band, or wavelength group, level making the optical switching system adaptable to a wider range of applications.

In accordance with another aspect of the present invention there is provided an optical switching system for switching optical signals in wavelength groups, the system comprising: a first optical switching matrix having multiple inputs and multiple outputs and being operable to switch a composite optical signal composed of a plurality of optical channel signals from any one of a plurality of the inputs to any one of a plurality of the outputs; at least one first wavelength division demultiplexer coupled at its input to an output of the first optical switching matrix for dividing a composite optical signal into groups of optical channel signals; a plurality of second optical switching matrices each matrix having multiple outputs and multiple inputs ate least one of which is coupled to a respective output of the first wavelength division demultiplexer, each matrix being operable to switch a group of optical channel signals from any one of a plurality of the inputs to any one of a plurality of the outputs; at least one first wavelength division multiplexer coupled at each of its inputs to an output of a respective one of the plurality of second optical switching matrices and coupled at its output to one of the inputs of the first optical switching matrix; a plurality of second wavelength division demultiplexers each coupled at its input to an output of a respective one of the plurality of second optical switching matrices for dividing a group of optical channel signals into optical channel signals; a plurality of third optical switching matrices each matrix having multiple outputs and multiple inputs at least one of which is coupled to a respective output of a respective one of the plurality of second wavelength division demultiplexers, each matrix being operable to switch an optical channel signal from any one of a plurality of the inputs to any one of a plurality of the outputs; and a plurality of second wavelength division multiplexers, each second multiplexer coupled at each of its inputs to an output of a respective one of the plurality of third optical switching matrices for combining optical channels into a group of optical channels and coupled at its output to one of the inputs of a corresponding one of the plurality of second optical switching matrices.

In accordance with a further aspect of the present invention there is provided an optical switching system for switching optical signals in wavelength groups, the system comprising: a first optical switching matrix having multiple inputs and multiple outputs and being operable to switch a composite optical signal composed of a plurality of optical channel signals from any one of a plurality of the inputs to any one of a plurality of the outputs; at least one first wavelength division demultiplexer coupled at its input to an output of the first optical switching matrix for dividing a composite optical signal into groups of optical channel signals; a plurality of second optical switching matrices each matrix having multiple outputs and multiple inputs at least one of which is coupled to a respective output of the first wavelength division demultiplexer, each matrix being operable to switch a group of optical channel signals from any one of a plurality of the inputs to any one of a plurality of the outputs; at least one first wavelength division multiplexer coupled at each of its inputs to an output of a respective one of the plurality of second optical switching matrices and coupled at its output to one of the inputs of the first optical switching matrix; a plurality of second wavelength division demultiplexers each coupled at its input to a corresponding output of the first wavelength division demultiplexer for dividing a group of optical channel signals into optical channel signals; at least one third wavelength division demultiplexer coupled at its input to an output of the first optical switching matrix for dividing a composite optical signals into optical channel signals; a plurality of third optical switching matrices each matrix having multiple outputs and multiple inputs at least one of which is coupled to a respective output of a corresponding second wavelength division demultiplexer and at least one of which is coupled to a respective output of the third wavelength division demultiplexer, each matrix being operable to switch a group of optical channel signals from any one of a plurality of the inputs to any one of a plurality of the outputs; a plurality of second wavelength division multiplexers, each multiplexer coupled at each of its inputs to an output of a respective one of the plurality of third optical switching matrices for combining optical channels into a group of optical channels and coupled at its output to one of the inputs of a corresponding one of the plurality of second optical switching matrices; and at least one third wavelength division multiplexer coupled at each of its inputs to an output of a respective one of the plurality of third optical switching matrices and coupled at its output to one of the inputs of the first optical switching matrix.

In accordance with a further aspect of the present invention there is provided an optical switching system for switching optical signals in wavelength groups, the system comprising: a first optical switching matrix having multiple inputs and multiple outputs and being operable to switch a composite optical signal composed of a plurality of optical channel signals from any one of a plurality of the inputs to any one of a plurality of the outputs; at least one first wavelength division demultiplexer coupled at its input to an output of the first optical switching matrix for dividing a composite optical signal into groups of optical channel signals; a plurality of second optical switching matrices each matrix having first and second inputs and first and second outputs, the first input is coupled to a respective output of the first wavelength division demultiplexer, each matrix having first and second switch states, in the first state the first output is connected to the second output and in the second state the first input is connected to the second output and the second input is connected to the first output; a plurality of second wavelength division demultiplexers each coupled at its input to the second output of a corresponding one of the plurality of optical switching matrices for dividing a group of optical channel signals into optical channel signals; a plurality of third optical switching matrices each matrix having multiple outputs and multiple inputs, a subset of which is coupled to a respective output of the second, each matrix being operable to switch a group of optical channel signals from any one of a plurality of the inputs to any one of a plurality of the outputs; at least one first wavelength division multiplexer coupled at each of its inputs to an output of a respective one of the plurality of second optical switching matrices and coupled at its output to one of the inputs of the first optical switching matrix; and a first plurality of wavelength division multiplexers, each multiplexer coupled at each of its inputs to an output of a respective one of the plurality of optical switching matrices for combining optical channels into a group of optical channels and coupled at its output to one of the inputs of a corresponding one of the first plurality of optical switching matrices.

Other aspects of the invention include combinations and subcombinations of the features described above other than the combinations described above.

BRIEF DESCRIPTION OF THE DRAWINGS

The invention will be further understood from the following detailed description of embodiments of the invention with reference to the drawings, in which:

FIG. 6 illustrates in an alternative functional block diagram the multiple granularity multiple plane optical switch core of FIG. 2a;

DETAILED DESCRIPTION

Figure 1B:
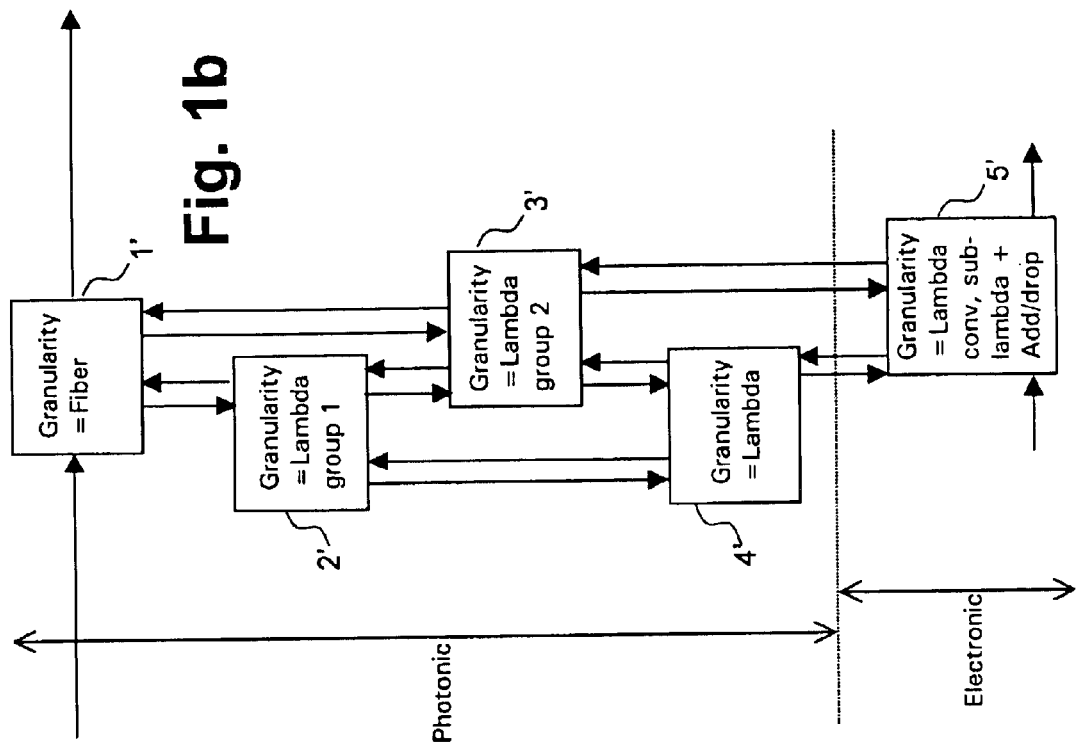
FIGS. 1a and 1b illustrate in functional block diagrams switch architectures having layered multiple granularity switch nodes in accordance with first and second embodiments of the present invention.
Figure 1A:
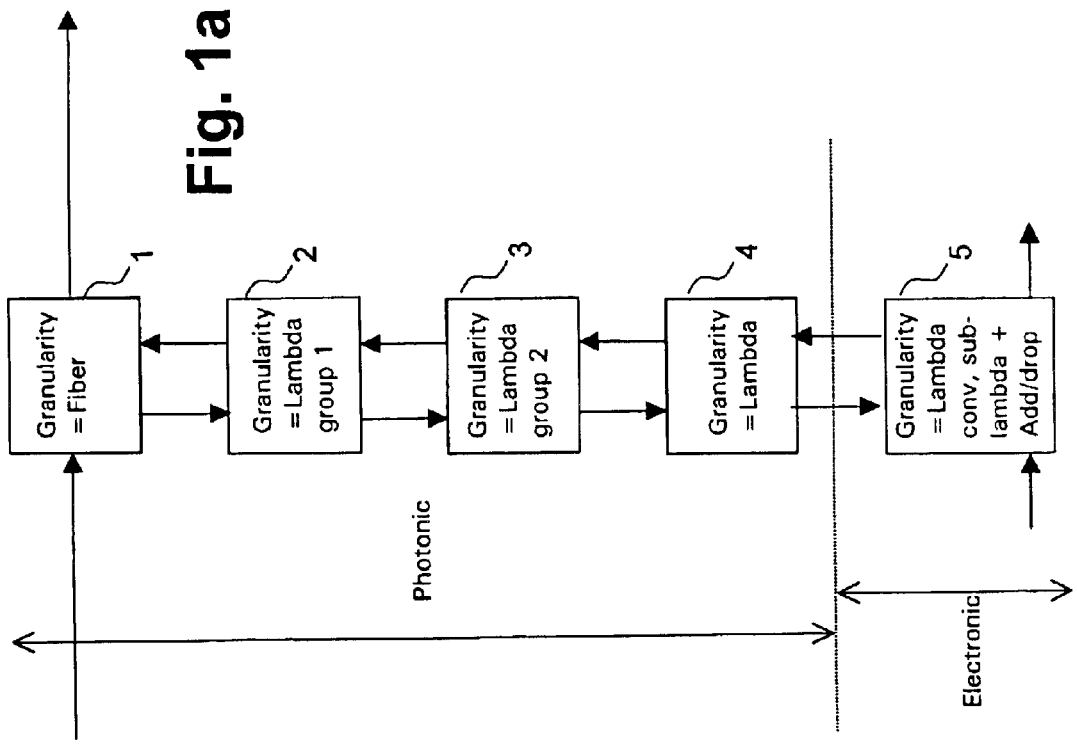

Referring to FIGS. 1a and 1b there are illustrated in functional block diagrams photonic switch architectures having layered multiple granularity switch cores in accordance with first and second embodiments of the present invention. In FIGS. 1a and 1b, boxes represent switch layers and solid headed arrows represent optical signals (i.e., individual channel wavelengths or groups thereof). FIGS. 1a and 1b show a photonic switch having a four layer optical hierarchy having: fiber granularity 1,1'; lambda group 1 granularity 2,2'; lambda group 2 granularity 3,3' (lambda group 2 a sub-group of lambda group 1); and lambda granularity 4,4', respectively. Below the lowest layer, the lambda layer 4,4' of the photonic switch in the electronic domain is a lambda/sub-lambda layer 5,5'. This gives the switch an optical granularity of four layers. These four layers can be implemented as physical layers where each fiber plane, lambda group plane and lambda plane occupies its own plane switch or as logical layers where two different layers in the hierachy share a common plane switch. Optical hierarchical layers can be arranged as two, three, four or even more layers. When more than two layers are used, then either all the lambdas going to the lower layers must traverse every layer above, as shown for four layers in FIG. 1a or some layers can optionally be bypassed as shown for four layers in FIG. 1b.

Figure 2B:
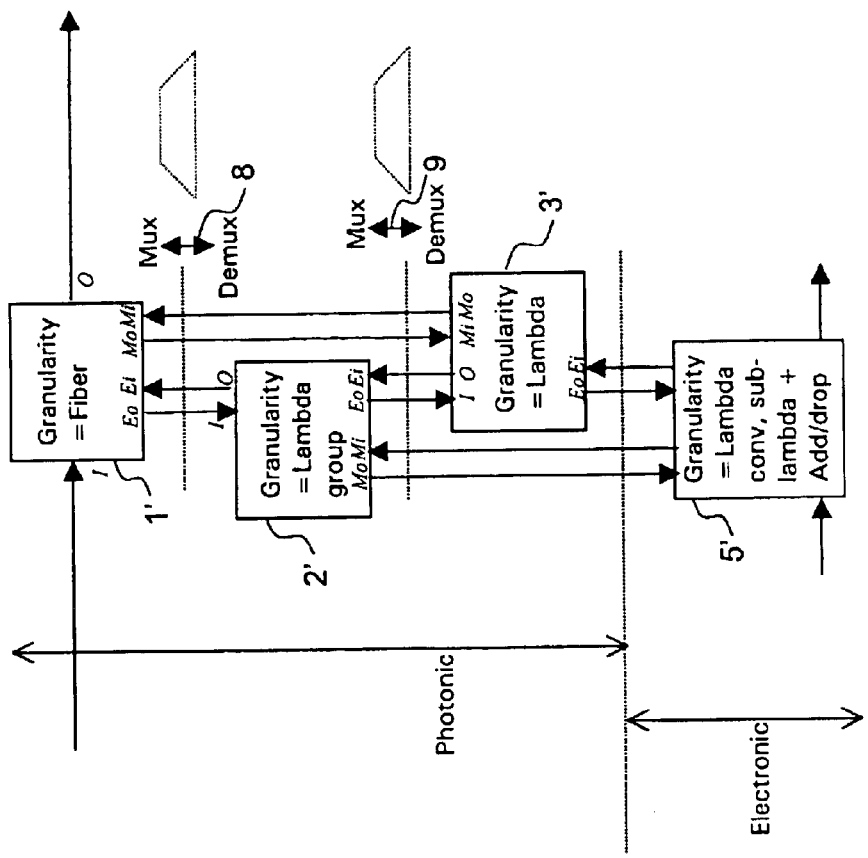
FIGS. 2a and 2b illustrate in functional block diagrams switch architectures having three layers of granularity in its optical switch nodes in accordance with third and fourth embodiments of the present invention.
Figure 2A:
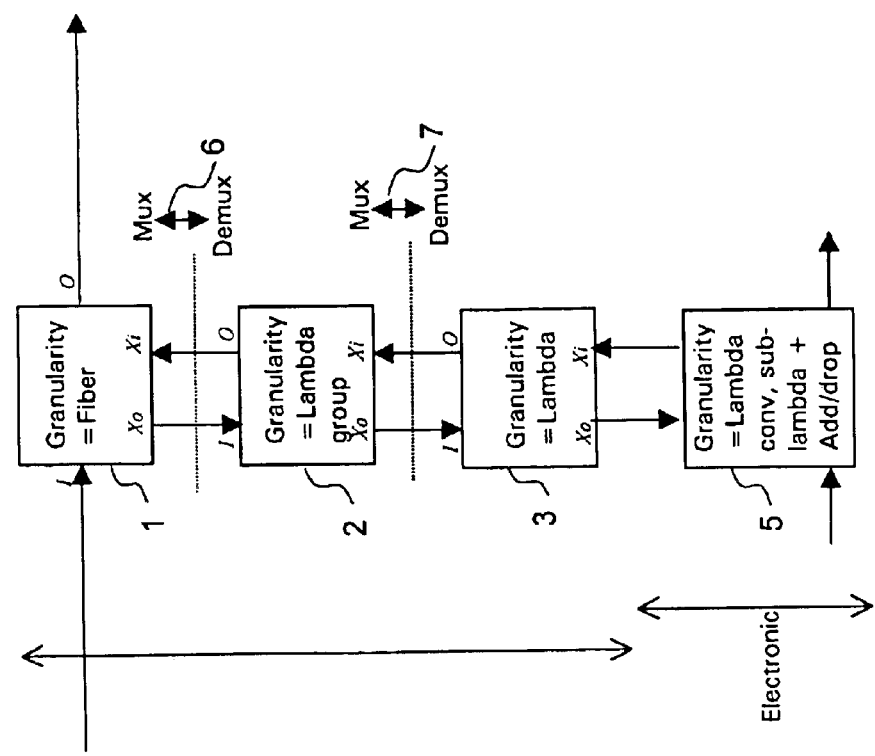
Figure 3:
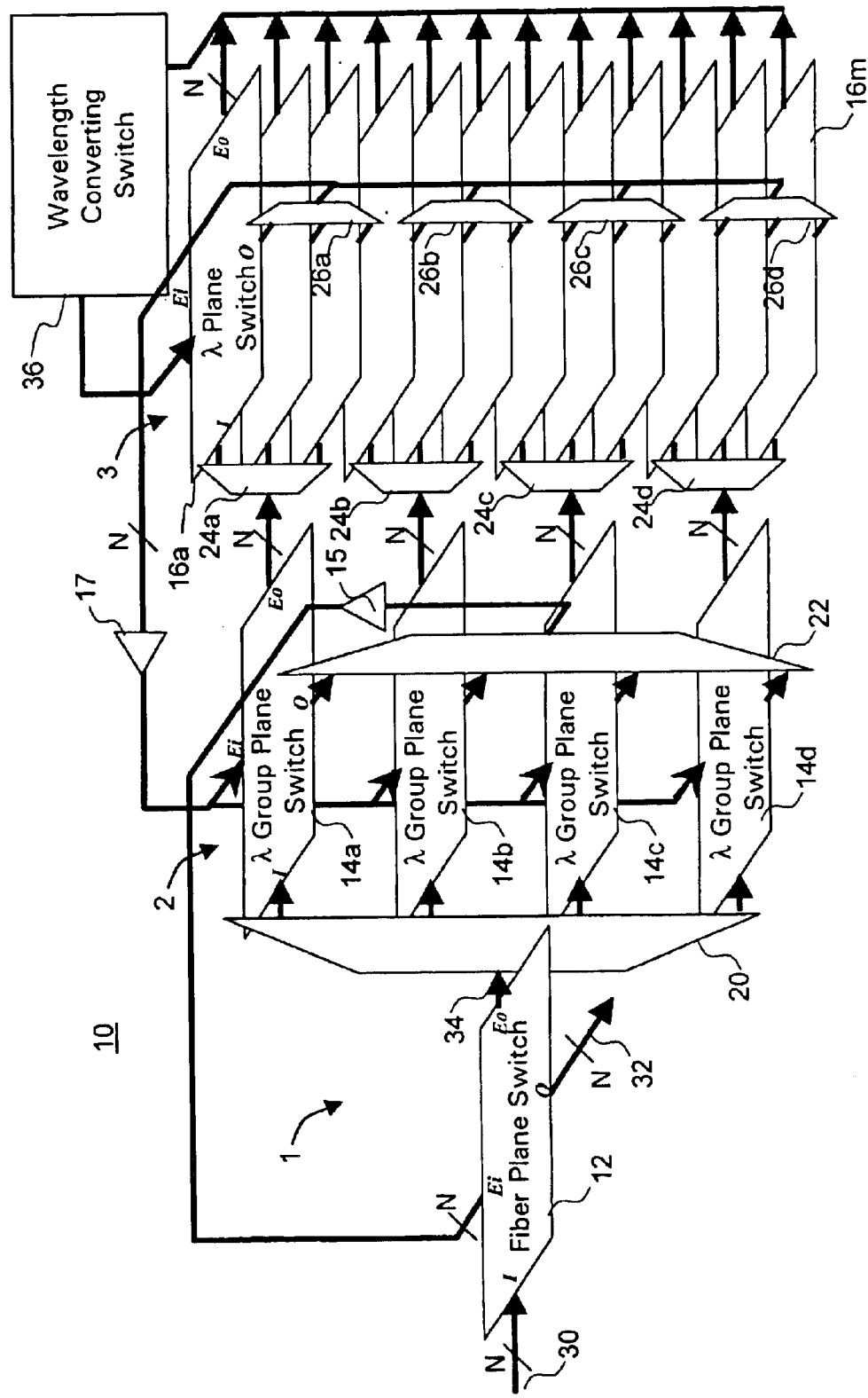
FIG. 3 illustrates in a functional block diagram the multiple granularity multiple plane optical switch core of FIG. 2a in further detail for 4-port MEMS in accordance with a fifth embodiment of the present invention.
Figure 5:
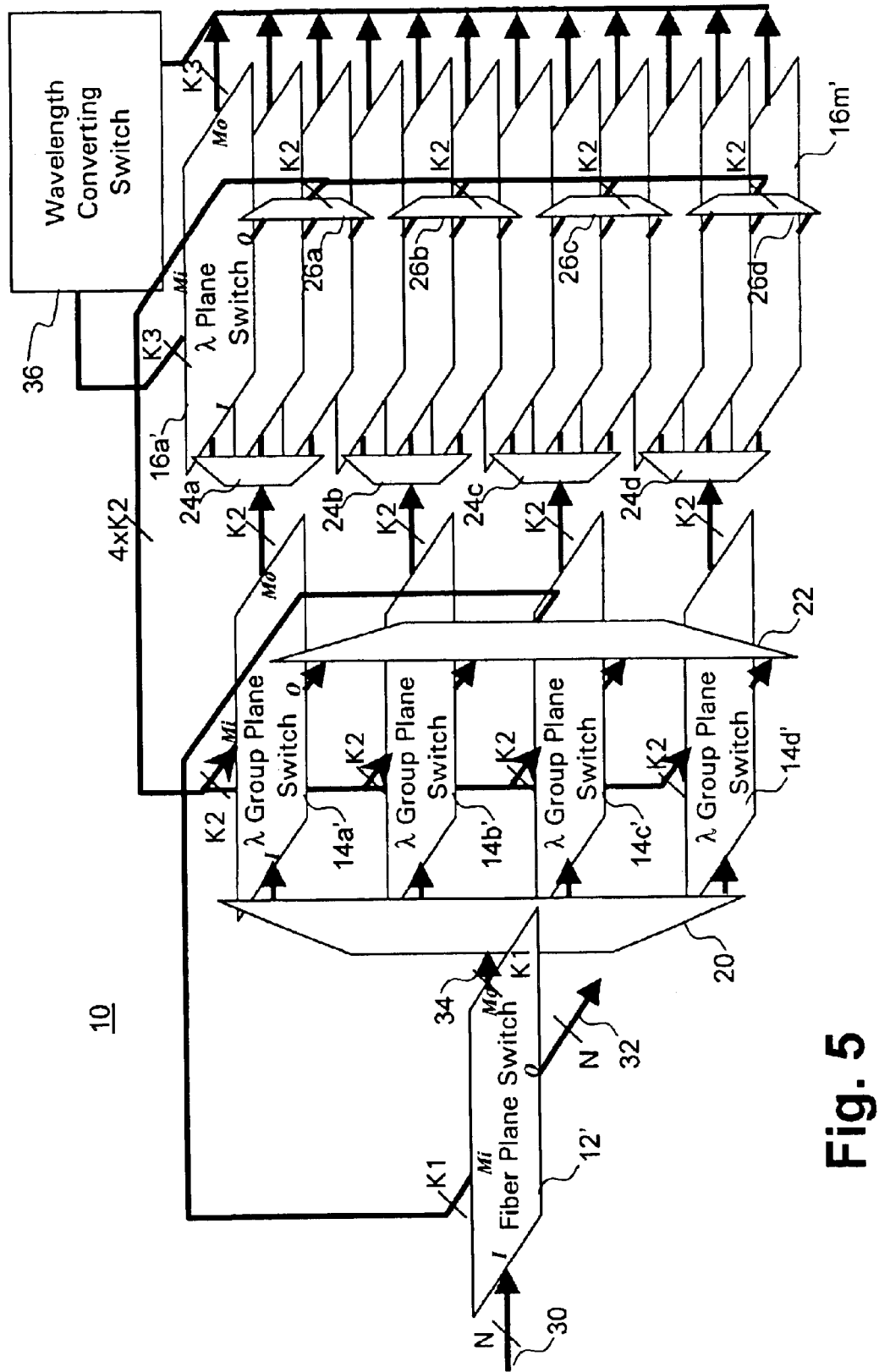
FIG. 5 illustrates in a functional block diagram the multiple granularity multiple plane optical switch core of FIG. 2a) in further detail for 6-port MEMS.
Figure 8:
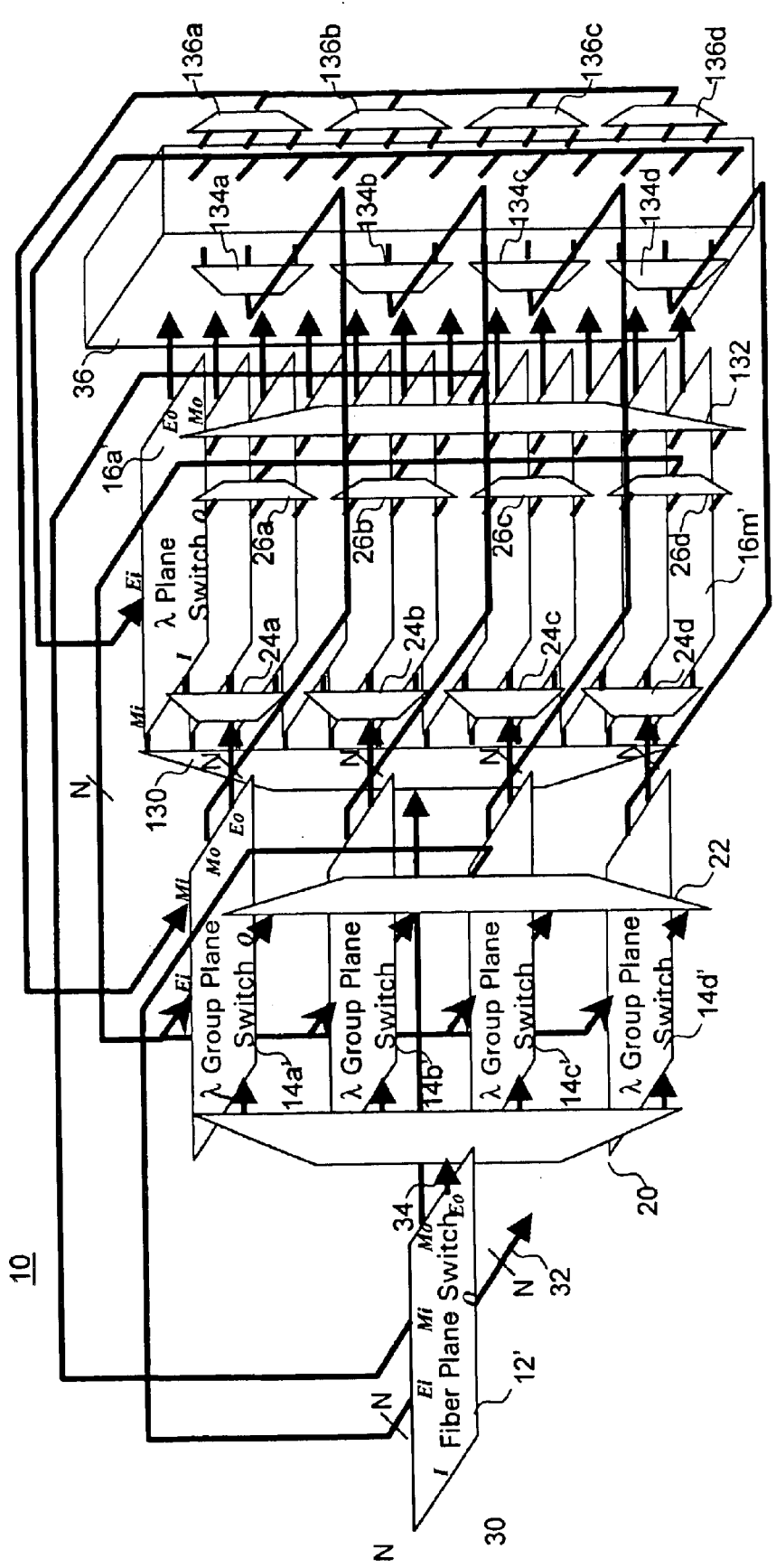
FIG. 8 illustrates in a functional block diagram the multiple granularity multiple plane optical switch core of FIG. 2b in further detail for 6-port MEMS.

Referring to FIGS. 2a and 2b there are illustrated in functional block diagrams switch architectures having three layers of granularity in its optical switch nodes in accordance with third and fourth embodiments of the present invention. FIGS. 2a and 2b show a photonic switch having a three layer optical hierarchy having: fiber granularity 1,1'; lambda group granularity 2,2'; and lambda 4,4', respectively. Below the lowest layer, the lambda layer 4,4' of the photonic switch in the electronic domain is a lambda//sub-lambda layer 5,5'. Multiplexers, demultiplexers 6 and 7, and 8 and 9 have been placed between the layers on FIGS. 2a and 2b respectively. In addition, to compensate for the increased loss of the mux/demux and the multiple layers of switching, optical amplifier arrays (Amplets) in either Semiconductor optical amplifier (SOA) or Erbium doped waveguide amplifier (EDWA) form may have to be used. (For simplicity, these are not shown in FIGS. 2a and 2b. Implementations of the architecture of FIG. 2a are shown in FIGS. 3 and 5. An implementation of FIG. 2b is shown in FIG. 8.

Referring to FIG. 3 there is illustrated in a functional block diagram the multiple granularity multiple plane optical switch core of FIG. 2a for 4-port MEMS based plane switches. The multiple granularity multiple plane optical switch core 10 switches Dense WDM (DWDM) optical signals, each signal consisting of M optical channel signals. Each of the M channels carries an optical signal modulated on an optical carrier of a wavelength unique to that channel. Incoming DWDM optical signals are input to a multi-plane optical switching system in which they can be switched to other fibers, split into lambda groups and switched at that level, or further demultiplexed, into their component optical channel signals (also known as wavelengths or lambdas), then switched by the lambda granularity layer 3 of the system 10, and later combined into lambda groups, and finally multiplexed, into outgoing DWDM optical signals. The system 10 has N input ports and N output ports to receive and transmit up to N incoming and up to N outgoing DWDM optical signals, respectively.

The optical switch core 10 includes a fiber plane optical switch 12, a plurality J of lambda group plane optical switches 14, each associated with a plurality L of lambda plane optical switches 16, where J×L=M, resulting in a total of M lambda plane switches. In FIG. 3, for example, J=4, L=3, hence M=12. Each plane switch is implemented in 4-port MEMS having input ports I and output ports O and expansion input ports Ei and expansion output ports Eo. Also included are a plurality N of 1 to J lambda band demultiplexers or de-interleavers 20, a plurality N of J to 1 lambda band multiplexers or interleavers 22. J pluralities of N 1 to L per lambda channelized demultiplexers are represented by 24a through 24d and J pluralities of N L to 1 per lambda channelized multiplexers are represented by 26a through 26d. For simplicity a controller for setting up switched paths through individual optical switches 12, 14, and 16 is not shown in FIG. 3. An array of low cost, low gain optical amplifiers 15 between the lambda group switch and the fiber switch and another array of similar optical amplifiers 17 between the lambda switches 16 and lambda group switches 14 are included. The purpose of arrays of amplifiers 15 and 17 is to equalize the loss through the various optical paths so that the output spectrum of the recombined WDM stream has a similar optical power spectrum in each wavelength. This is done to ensure that the emerging WDD streams contain a similar optical power in each spectral line, which will contribute to longer reach for optical transmission. A plurality N of fibers 30 are coupled to the plurality N of input ports (I) of the fiber plane switch 12 at the ingress of the system 10, each fiber 30 coupled to a respective input port. Output ports (O) of fiber plane optical switch 12 are coupled to a plurality N of fibers, with each fiber 32 coupled to a respective output port. The fiber plane optical switch 12 also has a plurality N of expansion output ports (Eo) 34 coupled to a plurality N of 1:J demultiplexers. Each demultiplexer separates the DWDM signal, having M optical channels therein, into J groups of L optical channels or lambdas where J×L=M. For simplicity, FIG. 3 shows four (4) lambda groups plane optical switches, that is for illustrative purposes only, J=4. The expansion output ports of the lambda planes 16a–m are coupled to a wavelength converting switch 36 that is not part of the photonic switch core of system 10.

In operation, the system 10 receives DWDM optical signals from the fibers 30. For those fibers whose signals are to be switched at the fiber level, including those fibers passing through the system 10, switching takes place in the fiber plane optical switch 12 between the input fibers 30 and the output fibers 32.

Each fiber whose signals are to be switched at the lambda group level, pass straight though the fiber plane optical switch 12 via expansion output ports (Eo) and are input to one of the 1:J demultiplexers 20 were the M channels of each fiber are split into J groups of L channels each. The lambda groups are switched in respective lambda groups plane optical switches 14a through 14d, recombined in one of the multiplexers 22, and input back into the fiber plane optical switch 12 via expansion input ports (Ei) thereof. Those lambda groups requiring switching at the lambda level pass straight through the respective lambda group plane optical switches 14a–d to be output (Eo) to respective demultiplexers 24a–d. Each lambda group optical signal is demultiplexed into its L component optical channel signals by a respective demultiplexer 24. The M optical channel signals are coupled to corresponding lambda plane optical switches 16. Each of the lambda plane optical switches 16 receive one of the M optical channel signals at one of its port inputs (I). Each of the lambda plane optical switches switch one of the lambda signals to one of its output ports (O) for muxing into lambda groups signals via multiplexers 26 and feeding back into respective lambda groups plane optical switches 14. A switch controller not shown in FIG. 3, for simplicity, controls the switching. As mentioned earlier, the arrays of optical amplifiers (15, 17) are to compensate for losses that are due to the components of switch 10. The plane switches (12, 14, 16) typically may have a loss of 1 dB and 6 dB in their straight through and switched paths, respectively. The demultiplexers 20 and multiplexers 22 both have typical loses of 3 dB and the demultiplexers 24 and multiplexers 26 have typical losses of 4 dB. Accordingly, signals switched at the fiber layer would have a 6 dB loss, while signals switched at the group or lambda layers would have 14 dB and 19 dB losses, respectively, if the arrays of optical amplifiers 15 and 17 were not included. The first array of optical amplifiers 15 have a gain of 8 dB while the second array 17 have a gain of 5 dB. This results in a typical loss of 6 dB for any level of switching (i.e., fiber, lambda group, lambda) of switches. Optical losses to and from the wavelength converting switch 36 would each be 10 dB if the arrays of optical amplifiers (15, 17) were not present. However, with the arrays of optical amplifiers (15, 17) the resulting losses for signals switched through the wavelength converting switch 36 are typically 8 dB. This result is for the case where the wavelength converting switch 36 has a 0 dB loss.

These amplifiers do not have to be conventional bulky high cost EDFA's because in an environment where only one wavelength or a small group of wavelengths is amplified within the optical amplifier, the lower performance of an EDWA is acceptable, permitting inexpensive and compact amplifier arrays to be deployed for this function. Alternatively SOAs could be used in arrays.

Figure 4A:
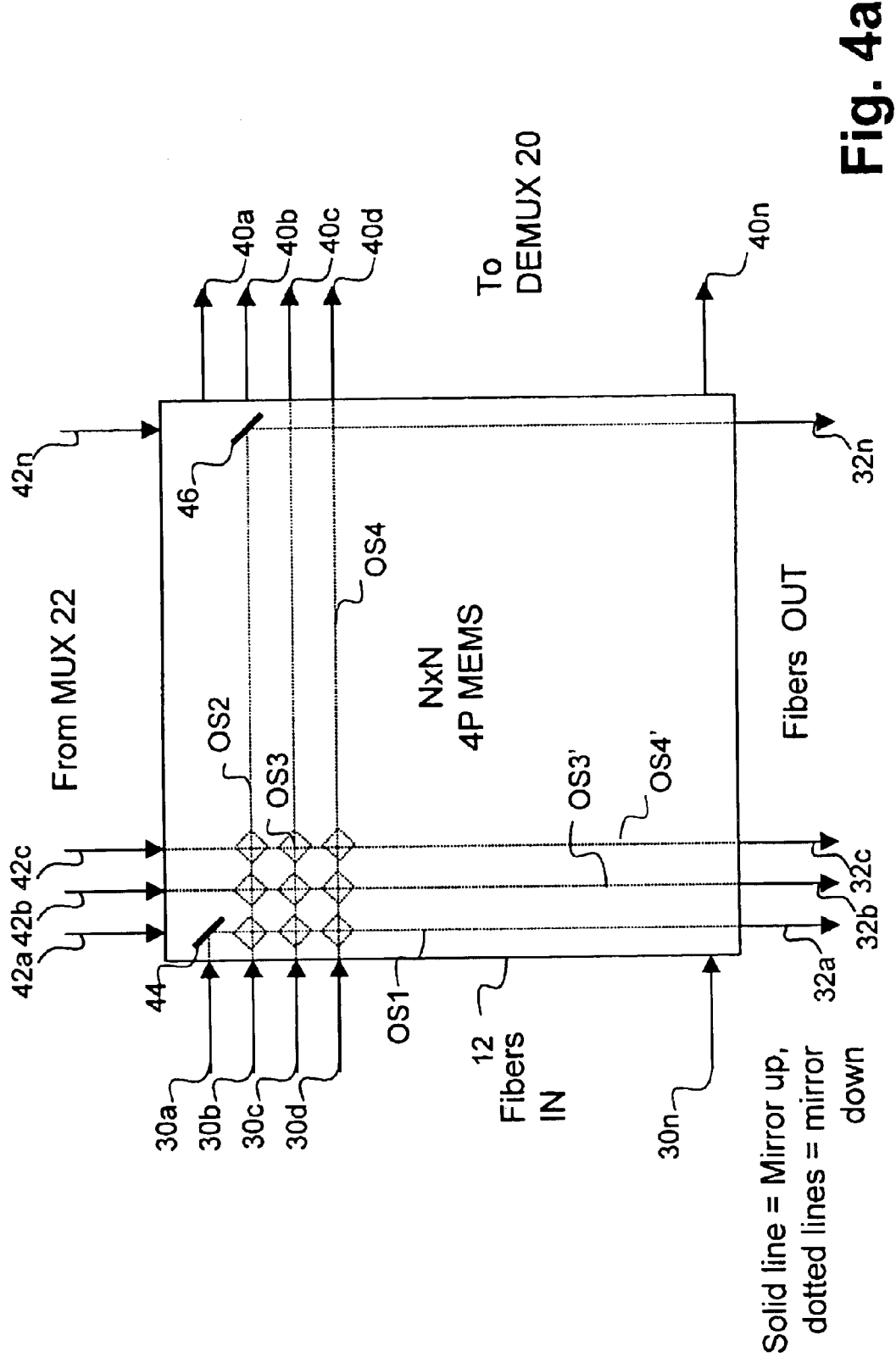
FIGS. 4a, 4b and 4c illustrate further detail of the 4-port plane optical switches of FIG. 3.
Figure 4B:
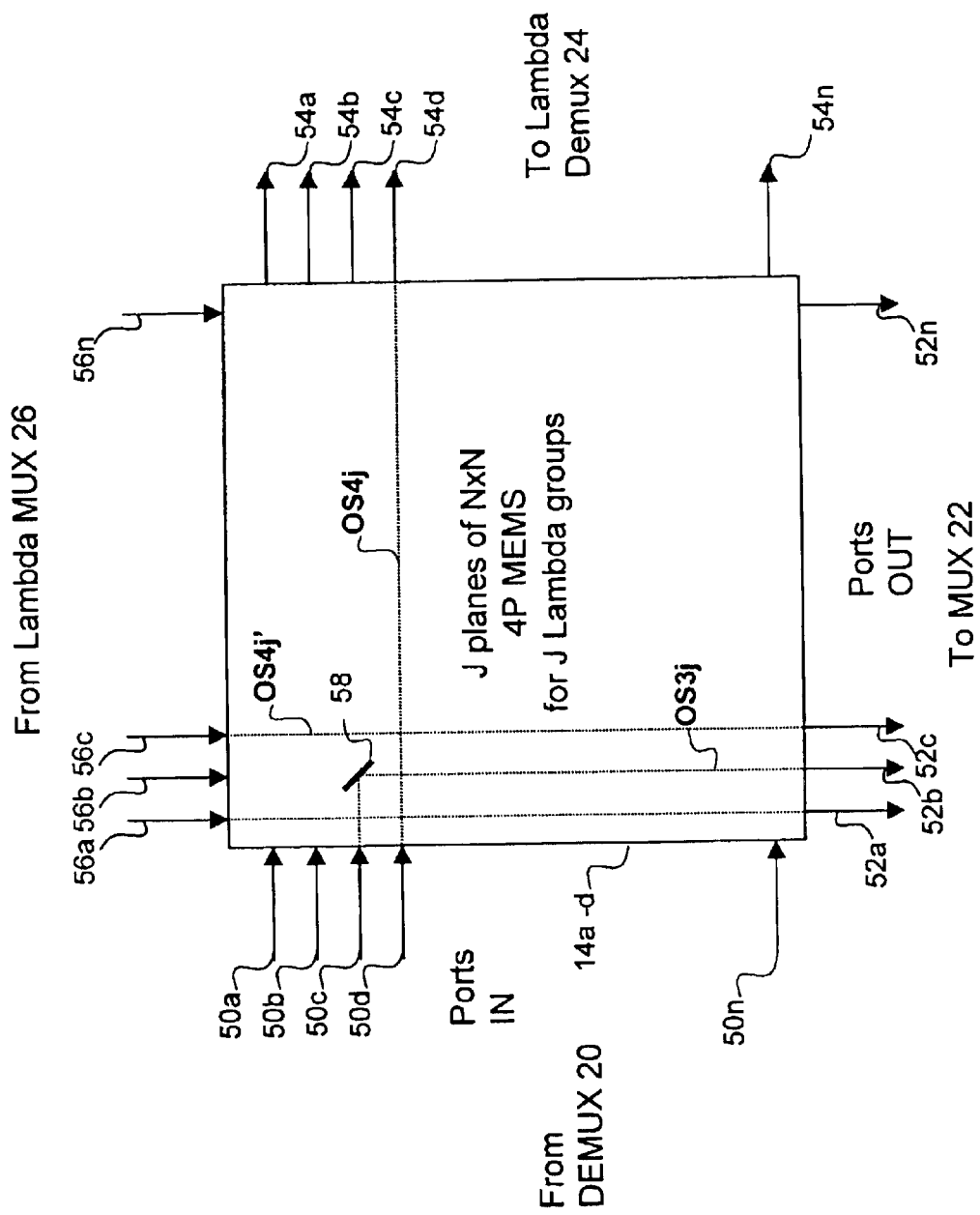
Figure 4C:
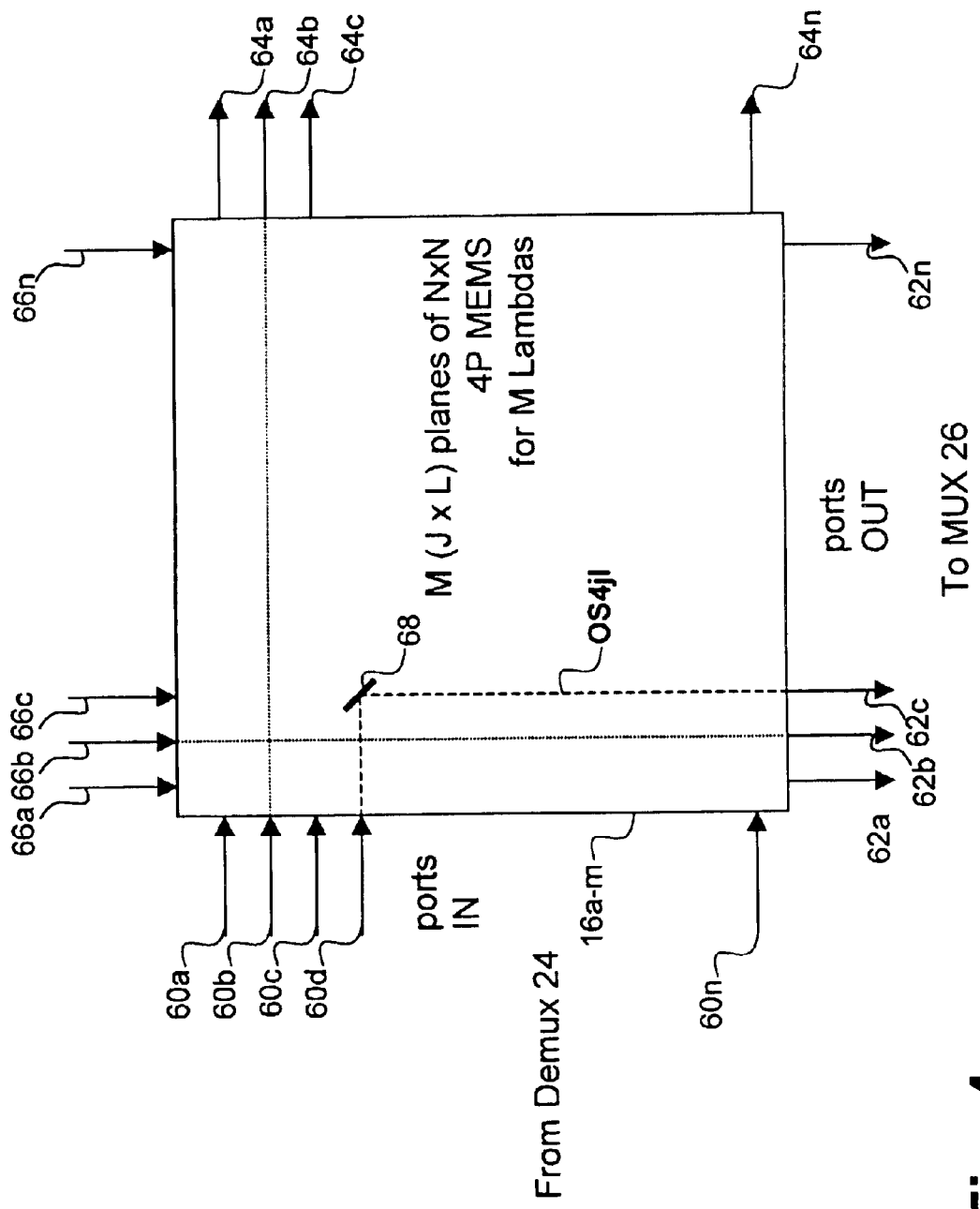

Referring to FIGS. 4a, 4b and 4c, there are illustrated in further detail the plane optical switches of FIG. 3 implemented in a MEMS 2-D pop-up mirror technology. For example, Lih Y. Lin describes such a device in the form of a Micro-Electro-Mechanical System (MEMs) in an article entitled "Free-Space Micromachined Optical-Switching Technologies and Architectures" in OFC99 Session W14-1 Proceedings published Feb. 24, 1999. FIG. 4a illustrates the fiber plane optical switch 12, FIG. 4b illustrates one of the lambda group plane optical switches 14 and FIG. 4c illustrates one of the lambda group plane optical switches 16.

Referring to FIG. 4a, the fiber plane optical switch 12 includes a four-port N×N micro-electro-mechanical switch matrix (4P MEMS), the plurality N of input ports for fibers 30a through 30n, the plurality N of switched output ports for fibers 32a through 32n, a plurality N of straight-through output ports 40a through 40n, and a plurality N of straight through input ports 42a through 42n. In use of optical switch matrix a mirror, usually oriented coplanar to the substrate, but hinged at an angle perpendicular to a line bisecting the angle formed by the desired paths of input and output beams. When raised to a normal position relative to the substrate, the mirror deflects light from one input port to one output port. For a switch of N inputs and M outputs array N×M such mirrors can connect any input to any output. When all the mirrors in a given row are down, light input at a given input port (I) can cross the entire array and exit at a corresponding expansion port (Eo) on the opposite side.

As discussed above J planes are provided for lambda group switching. Referring to FIG. 4b, each lambda group plane optical switch 14 includes a four-port N×N micro-electro-mechanical switch matrix (4P MEMS), a plurality N of lambda group input ports (I) 50a through 50n, a plurality N of switched lambda group output ports (O) 52a through 52n, a plurality N of straight-through lambda group output ports (Eo) 54a through 54n, and a plurality N of straight through lambda group input ports (Ei) 56a through 56n.

As discussed above M planes are provided for lambda switching, divided into J groups of L planes each. Referring to FIG. 4c, each lambda plane optical switch 16 includes a four-port N×N micro-electro-mechanical switch matrix (4P MEMS), a plurality N of lambda input ports 60a through 60n, a plurality N of switched lambda output ports 62a through 62n, a plurality N of straight-through lambda group output ports 64a through 64n, and a plurality N of straight through lambda group input ports 66a through 66n.

In operation of the optical switching system 10 of FIG. 3, optical signals carried on incoming fiber 30a–30n, that are to be switched at the fiber level, are switched directly to the output fibers using the N×N MEMS of the fiber plane optical switch 12. For example, considering FIG. 4a, if OS1 carried on incoming fiber 30a were to be switched at the fiber granularity level optical switching system 10, a mirror 44 at the (1,1) position would be activated to direct the signal to outgoing fiber 32a. Similarly, signal requiring spatial switching to another fiber, for example, if OS2 carried on incoming fiber 30b were to be switched to outgoing fiber 32n, a mirror 46 at position (2,n) would be activated.

By contrast, optical signals requiring switching at either the lambda group level or the lambda level would be output from the optical plane switch 12 via the straight through ports 40. For example, OS3 carried on incoming fiber 30c and OS4 carried on incoming fiber 30d pass straight through to output ports 40c and 40d, respectively. FIG. 4b shows the path of the optical signals OS3 and OS4 after demuxing to OS3j and OS4j, the jth lambda group portion of OS3 and OS4 respectively. In FIG. 4b, OS3j is switched to the second output port 52b, using a mirror 58 at position (3,2) (i.e., Row 3, column 2 in the N×N MEMS 14 from there it will go to multiplexer 22b the output of which is input back into port 42b of the fiber plane optical switch 12. Several optical groups belonging to OS3 could be switched, in their respective planes for outputting to any available fiber. In FIG. 4b, OS4j is shown as passing straight through to output port 54d. From there, the optical group signal OS4j is input to corresponding 1 to L demultiplexer 24.

FIG. 4c shows the path of the optical signal OS4j after demultiplexing to OS4jl, the lth lambda OS4j. In FIG. 4c, OS4*jl* is switched to the third output port 62*c*, using a mirror 68 at position (4,3) from there it will go to one of the multiplexers 26, the output OS4*j*' of which is input back into port 56*c* of the lambda group plane optical switch 14. The output OS4*j*' of port 52*c* is input into multiplexer 22*c*, the output OS4' of which is input into port 42*c* and output onto its respective fiber via output port 32*c*. Several a optical groups belonging to OS3 could be switched, in their respective planes for outputting to any available fiber. In FIG. 4*b*, OS4*j* is shown as passing straight through to output port 54*d*. From there, the optical group signal OS4*j* is input to corresponding 1 to L demultiplexer 24.

Referring to FIG. 5 there is illustrated in a functional block diagram the multiple granularity multiple plane optical switch core of FIG. 2*a*) in further detail for 6-port MEMS. The optical switch core 10 includes a fiber plane optical switch 12', a plurality J of lambda group plane optical switches 14', each associated with a plurality L of lambda plane optical switches 16', where J×L=M, resulting in a total of M lambda plane switches. Each plane switch is implemented in 6-port MEMS having N input ports (I) and N output ports (O); N expansion input ports (Ei) and N expansion output ports (Eo); and K matrix input ports (Mi) and K matrix output ports (Mo). (Expansion ports are not shown in FIG. 5, but are discussed in further detail herein below.) Also included are a plurality N of 1 to J lambda band demultiplexers 20, a plurality N of J to 1 lambda band multiplexers 22. J pluralities of N 1:L demultiplexers, as represented by 24*a* through 24*d* and J pluralities of N L:1 multiplexers, as represented by 26*a* through 26*d*. For simplicity a controller is not shown in FIG. 5. Also not shown for the sake of simplicity are the arrays of optical amplifiers (15, 17) of FIG. 3. A plurality N of fibers 30 are coupled to the plurality N of input ports (I) of the fiber plane switch 12' at the ingress of the system 10, each fiber 30 coupled to a respective input port. Output ports (O) of fiber plane optical switch 12' are coupled to a plurality N of fibers, with each fiber 32 coupled to a respective output port. The fiber plane optical switch 12' also has a plurality K1 of matrix output ports (Mo) 34' coupled to a plurality K1 of 1:J demultiplexers 20. Each of the demultiplexers 20 separates the DWDM signal, having M optical channels therein, into J groups of L optical channels or lambdas where J×L=M. For simplicity, FIG. 5 shows four (4) lambda groups with three (#) lambdas per group, that is for illustrative purposes only, J=4, and L=3.

At the lambda group plane switch 14', a plurality K1 of demultiplexer 20 outputs are coupled to the plurality K1 of input ports (I) of the lambda group plane switch 14'. Output ports (O) of lambda group plane optical switch 14' are coupled to a plurality K1 of inputs to multiplexers 22, with each input connected to a respective output port. The lambda group plane optical switch 14' also has a plurality K2 of matrix input ports (Mi) 56' coupled to a plurality K2 of L:1 multiplexers 26 and a plurality K2 of matrix output ports (Mo) 54' coupled to a plurality K2 of 1:L demultiplexers 24.

At the lambda plane switch 16', a plurality K2 demultiplexer 24 outputs are coupled to the plurality K2 of input ports (I) of the lambda plane switch 16'. Output ports (O) of lambda plane optical switch 16' are coupled to a plurality K2 of inputs to multiplexers 26, with each input connected to a respective output port. The lambda plane optical switch 16' also has a plurality K3 of matrix input ports (Mi) 66' coupled to a plurality K3 of 1:L demultiplexers 24 and a plurality K3 of matrix output ports (Mo) 64' coupled to a plurality K3 of L:1 multiplexers 26. The lambda plane optical switch 16' also has a plurality K2 of expansion input ports (Ei) and a plurality K2 of expansion output ports (Eo) for expanding the capability of the core switch.

In operation, the system 10 receives DWDM optical signals from the fibers 30. For those fibers whose signals are to be switched at the fiber level, including those fibers passing through the system 10, switching takes place in the fiber plane optical switch 12' between the input fibers 30 and the output fibers 32.

Each fiber whose signals are to be switched at the lambda group level, pass though the fiber plane optical switch 12' via matrix output ports (Mo) and are input to one of the K1 1:J demultiplexers 20 were the M channels of each fiber are split into J groups of L channels each. The lambda groups are switched in respective lambda groups plane optical switches 14*a*' through 14*d*', recombined in one of the K1 multiplexers 22, and input back into the fiber plane optical switch 12' via matrix input ports (Mi) thereof.

Those lambda groups requiring switching at the lambda level pass through the respective lambda group plane optical switches 14*a–d* to one of the K2 matrix output ports (Mo) to a respective one of the K2 demultiplexers 24*a–d*. Each lambda group optical signal is demultiplexed into its L component optical channel signals by a respective demultiplexer 24. Each of the demultiplexed optical channel signals are coupled to a corresponding lambda plane optical switch 16. Each of the lambda plane optical switches 16 receive one of the coupled optical channel signals at one of its K2 port inputs (I). Each of the lambda plane optical switches switch one of the coupled optical channel signals to its output ports (O) for muxing into lambda groups signals via a respective one of the K2 multiplexers 26 and feeding back into respective lambda groups plane optical switches 14.

Figure 6:
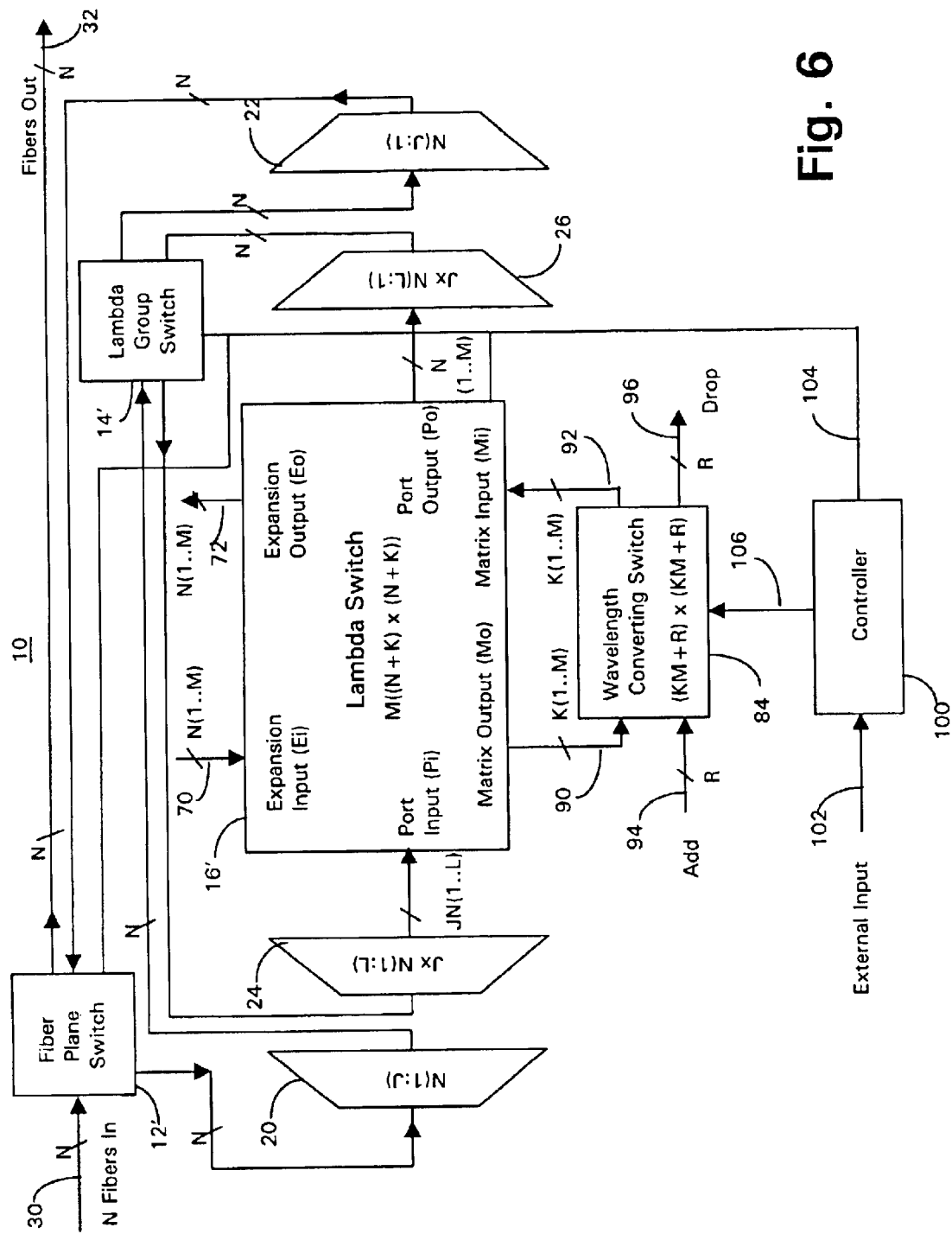

Referring to FIG. 6 there is illustrated in an alternative functional block diagram, the multiple granularity multiple plane optical switch core of FIG. 2*a*.

The M lambda plane switches 16*a*'–16*m*' are implemented as six-port MEMS and include a plurality K of matrix output ports (Mo) and a plurality K of matrix input ports (Mi) for coupling optical channel signals to a wavelength converting switch 84. A plurality K of optical buses 90, each of width M, couple K*M matrix output ports (Mo) to the wavelength converting switch 84 at its ingress. Similarly, the egress of the wavelength converting switch 84 is coupled to K*M matrix input ports (Mi) via a plurality K of optical buses 92, each of width M.

The wavelength converting switch 84 is an array of optical receivers, for example, an array of optical transmitters of various wavelengths (covering the range of channel wavelengths) and an electrical switch to connect the appropriate receiver to the appropriate transmitter. The wavelength converting switch 84 has a plurality R of inputs for adding channel signals 94 in either optical or electrical form and a plurality R of outputs for dropping channel signals 96 in either optical or electrical form. Both require the electrical switch to be (KM+R)×(MK+R), however, electrical add/drop requires only (KM)(number of receivers)*(number of transmitters), while optical add/drop requires (KM+R)) (number of receivers)*(number of transmitters).

The controller 100 has an input 102 for receiving external input, for example from other switching systems or from a network controller, and changing the operation of the system in response to the input as required. The controller 100 is coupled to the lambda plane optical switches 16, lambda group plane optical switches 14 and fiber plane optical switch 12 via an optical or electrical communication link 104 and to the wavelength converting switch 84 via a similar link 106 for effecting this change in operation.

The switch controller 100 shown in FIG. 6 controls all of the switching in the fiber, lambda groups and lambda planes. The switch controller 100 controls the lambda plane optical switches, optical signals arriving at the input ports (Pi) of each switch are individually switched to one its port outputs (Po) or matrix outputs (Mo), or passed through to one of its expansion ports (Eo) according to the state, or configuration, of the optical switching system as determined by the controller 100. The wavelength converting switch 84 via its receivers and transmitters has the capability of converting the wavelength of an optical channel signal to another one of the unique wavelengths of the system as determined by the controller 100. Optical channel signals can also be added 94 or dropped 96 by the wavelength converting switch 84 under the direction of the controller 100. Added or converted optical channel signals on the wavelength converting switch 84 are received at the matrix inputs (Mi) of the lambda plane optical switches 16 via the K buses 92. Optical channel signals received at the matrix inputs (Mi) are individually switched to the port outputs (Po) where they are transmitted to the N*J multiplexers 26. Each of the N*J multiplexers 26 receives optical channel signals at its L inputs and multiplexes these signals into respective lambda groups which are in turn combined by one of the J:1 multiplexer 22 into a DWDM optical signal which is output on one of the fibers 32 via the fiber plane switch 12'.

Figure 7A:
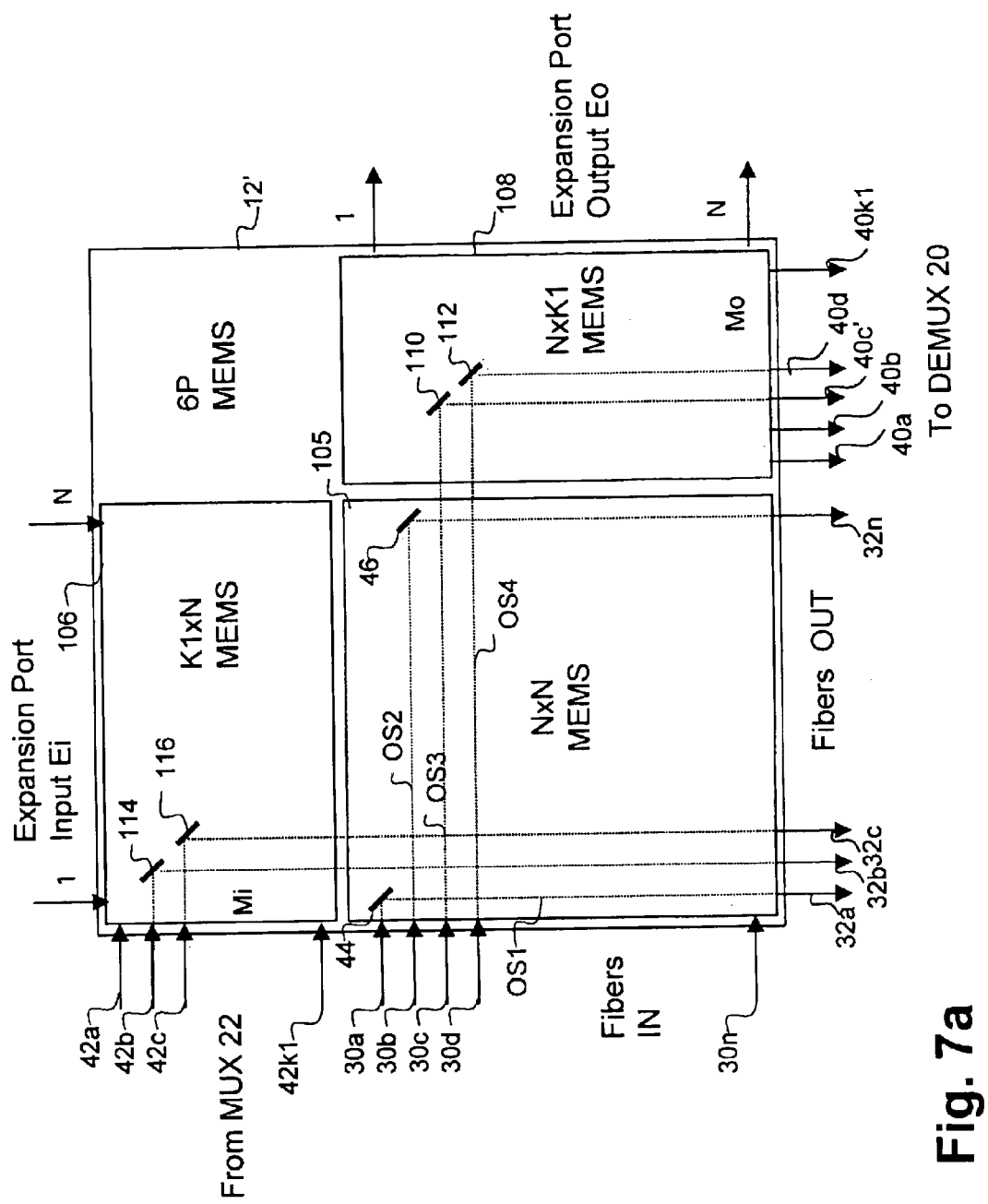
FIGS. 7a, 7b and 7c, illustrate further detail of the 6-port plane optical switches of FIGS. 5 and 6.
Figure 7B:
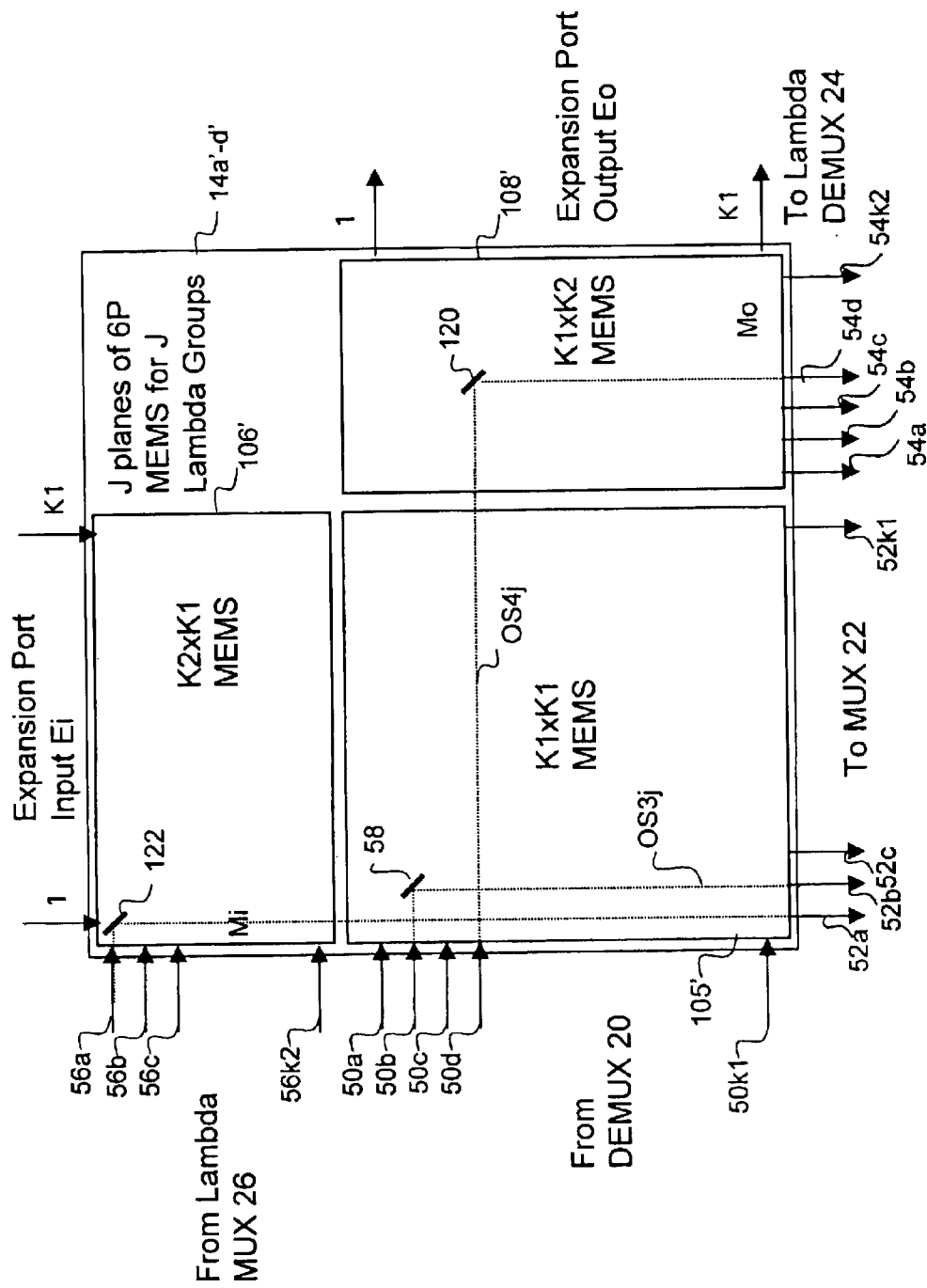
Figure 7C:
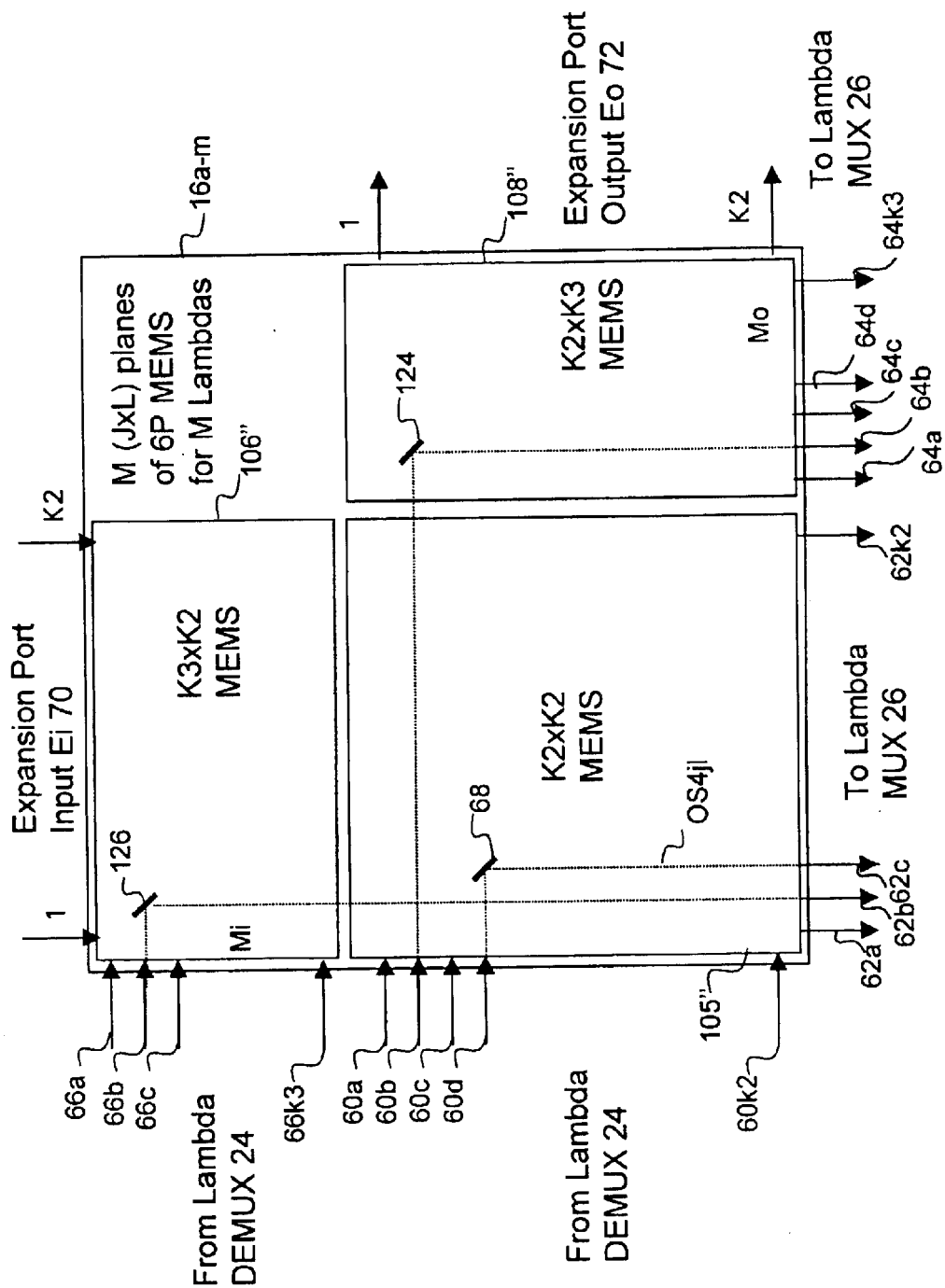

FIGS. 7a, 7b and 7c, illustrate further detail of the 6-port MEMS plane optical switches of FIGS. 5 and 6. FIG. 7a illustrates the fiber plane optical switch 12', FIG. 7b illustrates one of the lambda group plane optical switches 14' and FIG. 7c illustrates one of the lambda group plane optical switches 16'. The six-port fiber plane optical switch 12 includes a N×N micro-electro-mechanical switch matrix (MEMS) 105, a K1×N micro-electro-mechanical switch matrix (MEMS) 106, and a includes a N×K1 micro-electro-mechanical switch matrix (MEMS) 108. The fiber plane optical switch 12 also includes the plurality N of input ports for fibers 30a through 30n, the plurality N of switched output ports for fibers 32a through 32n, a plurality K1 of matrix output ports 40a' through 40k', and a plurality K1 of matrix input ports 42a through 42k1 and a plurality K1 of expansion input ports (Ei) and a plurality K1 of expansion output ports (Eo).

Referring to FIG. 7b, there are J planes provided for lambda group switching. Each lambda group plane optical switch 14' includes K1×K1 micro-electro-mechanical switch matrix (MEMS) 105', a K2×K1 micro-electro-mechanical switch matrix (MEMS) 106', and a includes a K1×K2 micro-electro-mechanical switch matrix (MEMS) 108'. Each lambda group plane optical switch 14' also includes a plurality K1 of lambda group input ports 50a through 50k1, a plurality K1 of switched lambda group output ports 52a through 52k1, a plurality K2 of lambda group matrix output (Mo) ports 54a through 54k2, and a plurality K2 of lambda group matrix input (Mi) ports 56a through 56k2.

Referring to FIG. 7c, there are M planes provided for lambda switching, divided into J groups of L planes each. Each lambda plane optical switch 16' includes K2×K2 micro-electro-mechanical switch matrix (MEMS) 105", a K3×K2 micro-electro-mechanical switch matrix (MEMS) 106", and a K2×K3 micro-electro-mechanical switch matrix (MEMS) 108". Each lambda plane optical switch 16' also includes a plurality K2 of lambda input ports 60a through 60k2, a plurality K2 of switched lambda output ports 62a through 62k2, a plurality 13 of lambda matrix output ports 64a through 64k3, and a plurality K3 of lambda matrix input ports 66a through 66k3. The M lambda plane optical switches 16' also each include a plurality K2 expansion inputs (Ei) 70 and a plurality K2 expansion outputs (Eo) 72 for the purpose of building out, or expanding, the optical switching system 10.

In operation of the optical switching system 10 of FIGS. 5 and 6, optical signals carried on incoming fiber 30a–30n, that are to be switched at the fiber level, are switched directly to the output fibers using the N×N MEMS 105 of the fiber plane optical switch 12'. For example, if OS1 carried on incoming fiber 30a were to "pass-through" optical switching system 10, a mirror 44 at the (1,1) position would be activated to direct the signal to outgoing fiber 32a. Similarly if OS2 carried on incoming fiber 30b were to be switched to outgoing fiber 32n, a mirror 46 at position (2,n) would be activated.

By contrast, optical signals requiring switching at either the lambda group level or the lambda level would be output via the matrix ports of N×K1 MEMS 108. For example, OS3 carried on incoming fiber 30c and OS4 carried on incoming fiber 30d pass straight through N×N MEMS 105 to mirrors 110 and 112, respectively then to matrix output ports 40c and 40d, respectively. Signals returning to the fiber plane via matrix input ports are shown by way of example at 42b and 42c, deflecting off of mirrors 114 and 116 of the K1×N MEMS 106, respectively, and passing through the N×N MEMS 105 to exit output port 32b and 32c, respectively.

FIG. 7b shows the path of the optical signals OS3 and OS4 after demuxing to OS3j and OS4j, the jth lambda group portion of OS3 and OS4 respectively. In FIG. 7b, OS3j is switched to the second output port 52b, using a mirror 58 at position (3,2) from there it will go to multiplexer 22b before being input back into port 42b of the fiber plane optical switch 12.' Several optical groups belonging to OS3 could be switched, in their respective planes for outputting to any of the available output fibers 32a–n. In FIG. 7b, OS4j is shown as passing straight through K1×K1 MEMS 105', off mirror 120 to matrix output port 54d. From there, the optical group signal OS4j is input to corresponding 1:L demultiplexer 24. A signal matrix input 56a' is switched by mirror 122 to output 52a.

FIG. 7c shows the path of the optical signal OS4j after demultiplexing to OS4jl, the lth lambda OS4j. In FIG. 7c, OS4jl is switched to the third output port 62c, using a mirror 68 at position (4,3) from there it will go to multiplexer 26 before being input back into port 56c of the lambda group plane optical switch 14'. Several optical groups belonging to OS3 could be switched, in their respective planes for outputting to any available fiber. In FIG. 7c OS4jl is shown as switched from input 60d to output 62c by mirror 68. From there, the optical group signal OS4j is input to corresponding 1 to L demultiplexer 24. Another signal input at port 60b passes straight through K2×K2 MEMS 105" and is switched by mirror 124 of K2×K3 MEMS 108" to matrix output port 64b. Still another signal at matrix input 66b is switched by mirror 126 of the K3×K2 MEMS 106" to output 62b. The implementation in FIGS. 5, 6 and 7 allows the expansion ports Ei, Eo to be reserved for intra-plane expansion. If 4-port MEMS were used, as the Mi, Mo ports do not exist, the Ei, Eo ports would have to be used instead. This has two negative consequences, firstly the Ei, Eo ports are no longer available for expansion and secondly switching concentration that the Mi, Mo ports would provide is not available since the straight-through Ei, Eo ports do not provide any additional switching. Hence, when the Mi, Mo ports are used, the individual layers can be optimized in traffic capacity (e.g. if only 30% of the lambda-group throughput is destined for the per-lambda plane, then the per-lambda plane can be built from smaller switches, e.g. 35–50% of the size).

Referring to FIG. 8 there is illustrated in a functional block diagram the multiple granularity multiple plane optical switch core of FIG. 2b in further detail for 6-port MEMS in accordance with a further embodiment of the present invention. In the embodiment of FIG. 8, the expansion ports Ei and Eo of each plane switch 12', 14', and 16' are used to connect to the MUX and DEMUX of FIG. 5. The matrix ports Mi and Mo are used to effectively bypass intervening switch layers as shown in the architecture FIG. 2a The matrix output ports Mo of plane switch 12' are connected to K 1:M DEMUX 130 to effect direct connection from the fiber plane switch 12' to the M lambda plane switches 16a'–16m'. Similarly, the matrix outputs from the lambda switches are multiplexed via K M:1 MUX 132 and connected back to the fiber plane switch via matrix inputs Mi.

Each of the lambda group switches 14a'–14d' has its matrix output ports Mo connected to respective DEMUX 134a–d, that demultiplex the lambda groups into lambdas for conversion to other lambdas, or plural sublambda signals for add, drop functionality. MUX 136a–d multiplex signals into lambda groups for input back into the lambda group plane switches 14a'–14d' via their matrix input ports Mi. Not shown for the sake of simplicity are the arrays of optical amplifiers (15, 17) of FIG. 3.

As a consequence of this arrangement, the embodiment of the architecture of FIG. 2b, signals on a given layer need not traverse intervening layers in order to be switched at higher or lower layers. This reduces the traffic on a particular plane switch and hence contributes to non-blocking through the switch core 10.

Figure 9:
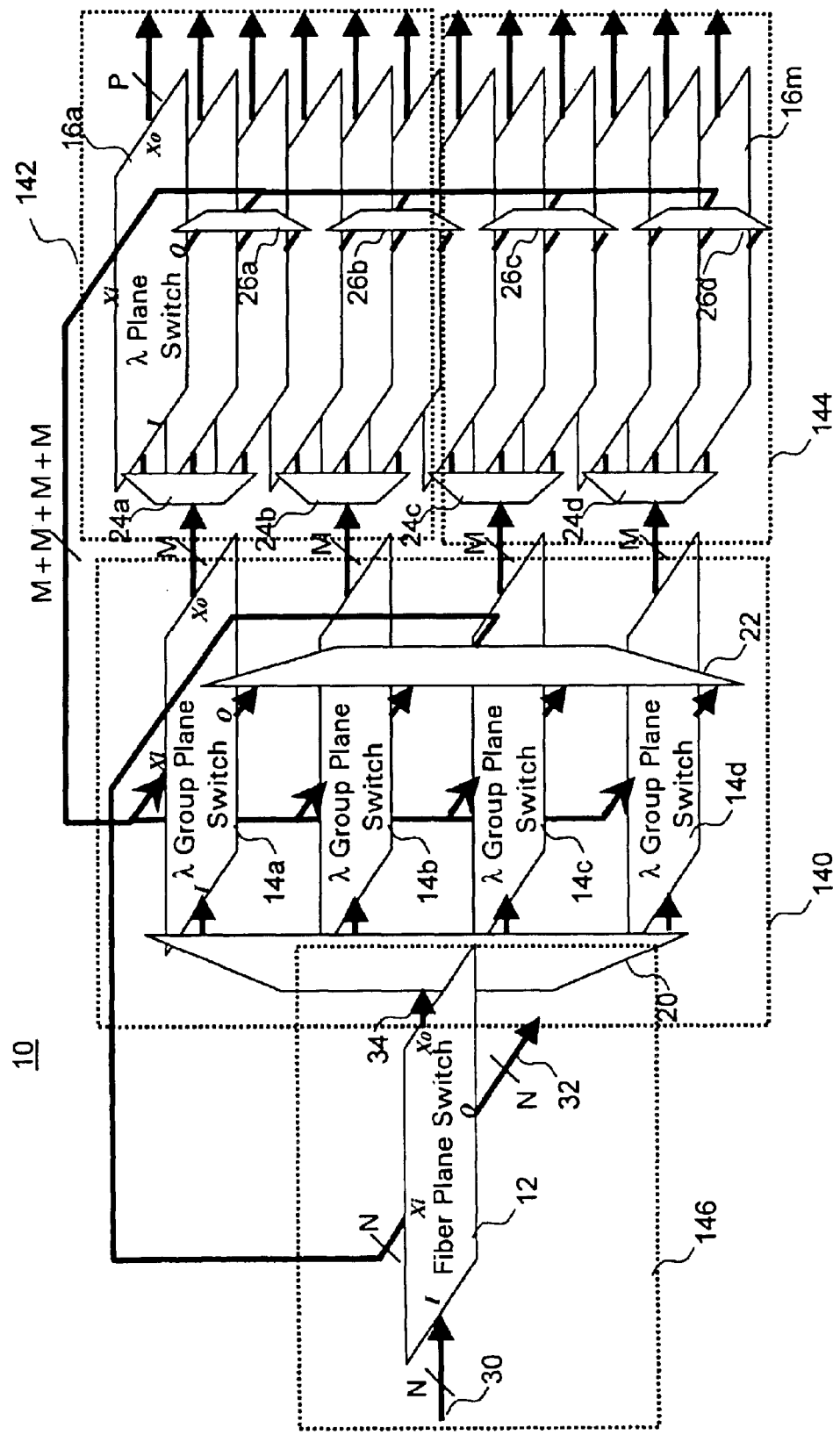
FIG. 9 illustrates the multiple granularity multiple plane optical switch core of FIG. 3 or 5 partitioned according to a first packaging option.

Referring to FIG. 9 there is illustrated the multiple granularity multiple plane optical switch core of FIG. 3 or 5 partitioned according to a first packaging option. The layer switch can be partitioned physically into different shelves 140, 142, and 144 as shown, with the fiber plane switch 12 housed separately 146.

Figure 10:
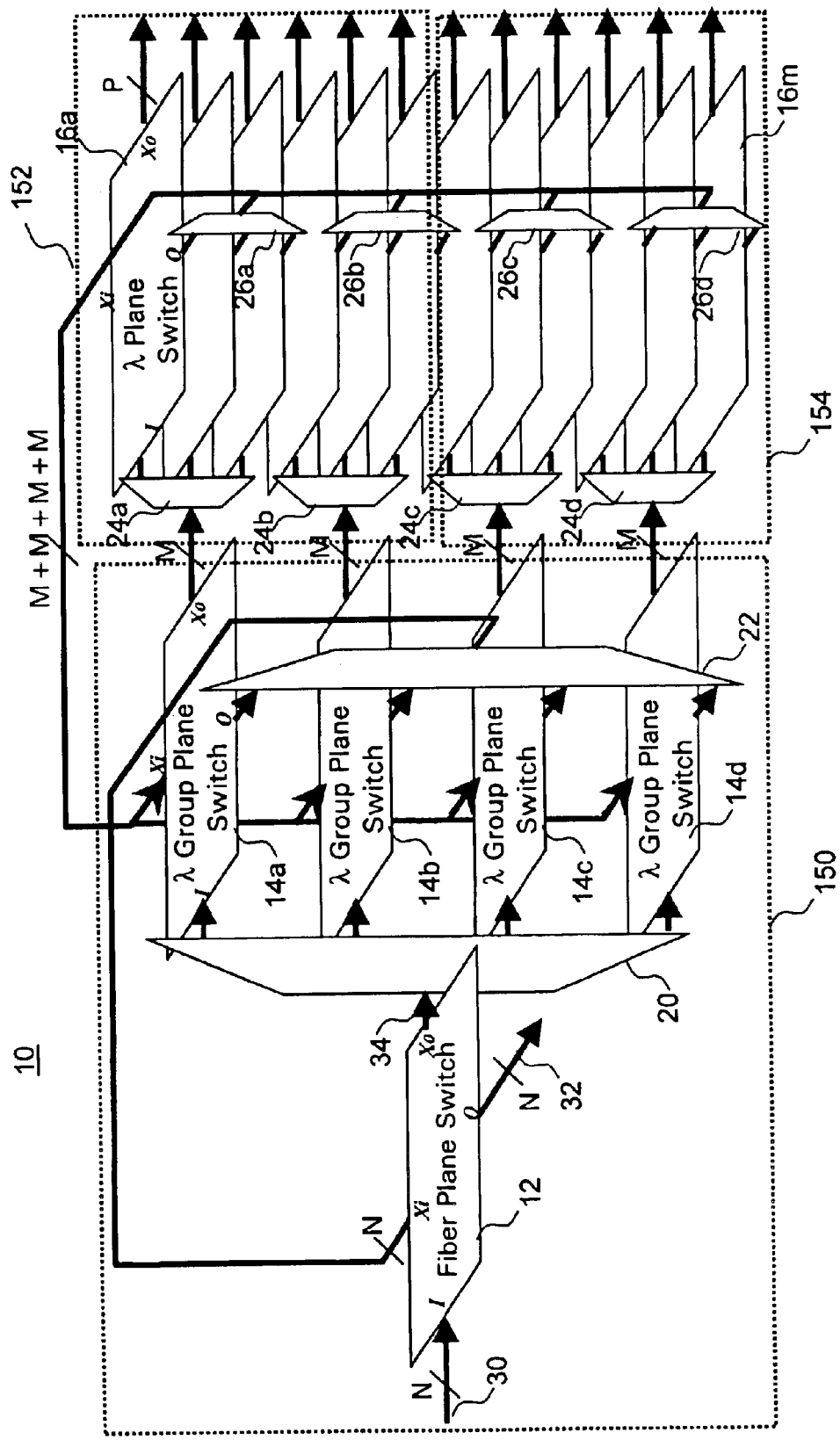
FIG. 10 illustrates the multiple granularity multiple plane optical switch core of FIG. 3 or 5 partitioned according to a second packaging option.

Referring to FIG. 10 there is illustrated the multiple granularity multiple plane optical switch core of FIG. 3 or 5 partitioned according to a second packaging option. This shows the packaging partitioning for a combined lambda group, fiber switch shelf 150, with subtending per lambda switching shelves 152 and 154. The shelf/bay housing the fiber-level switch and the group switch would as well house the line pre-amplifiers to remove the effects of loss contributed by the outside plant, and line post-amplifiers which provide the high power WDM outside plant drive. These necessarily are highly optimized EDFA's with high linearity, power output since they are handling the full WDM spectrum.

Figure 11:
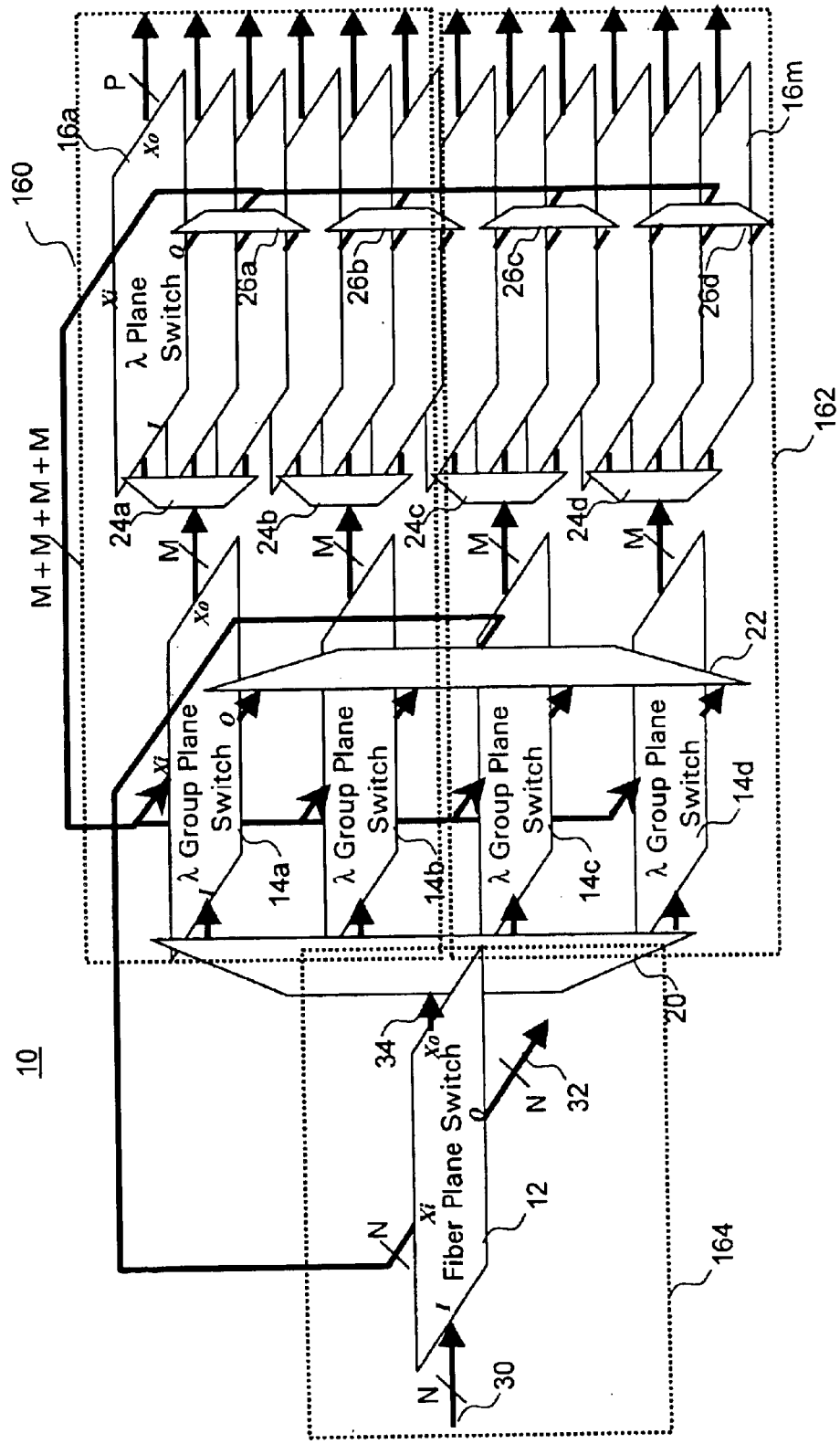
FIG. 11 illustrates the multiple granularity multiple plane optical switch core of FIG. 3 or 5 partitioned according to a third packaging option.

Referring to FIG. 11 there is illustrated the multiple granularity multiple plane optical switch core of FIG. 3 or 5 partitioned according to a third packaging option. This shows the packaging partitioning for a combined lambda, lambda group shelf 160 and 162, and a single additional shelf/bay 164 to house the fiber-level switch as well as the line pre-amplifiers to remove the effects of loss contributed by the outside plant, and line post-amplifiers which provide the high power WDM outside plant drive. These necessarily are highly optimized EDFA's with high linearity, power output since they are handling the full WDM spectrum.

Figure 12:
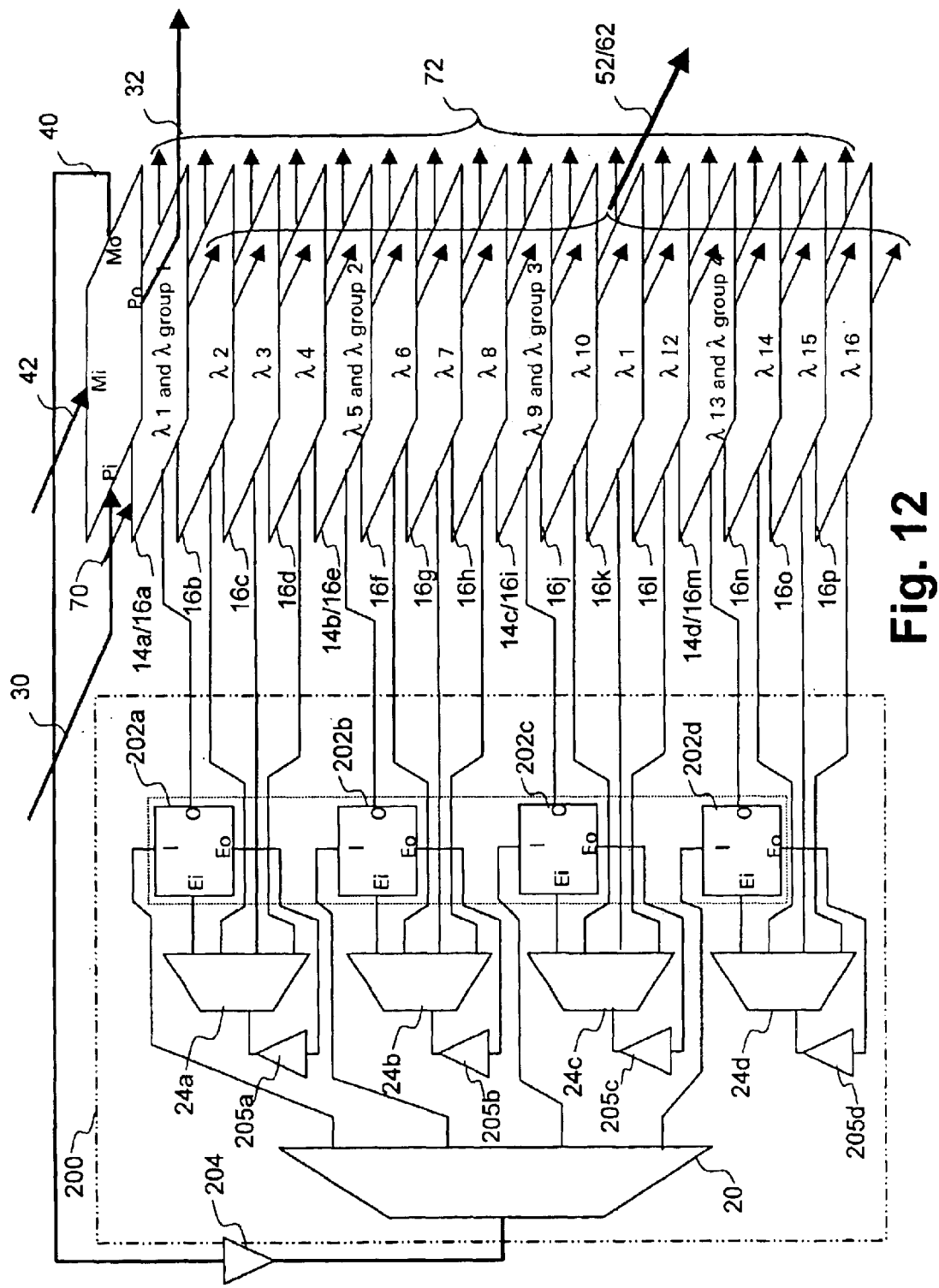
FIG. 12 illustrates in a functional block diagram the multiple granularity multiple plane optical switch core of FIG. 2 in further detail for 6-port MEMS in accordance with another embodiment of the present invention.

Referring to FIG. 12 there is illustrated in a functional block diagram the multiple granularity multiple plane optical switch core of FIG. 2 in further detail for 6-port MEMS in accordance with another embodiment of the present invention. For convenience the same reference characters used in earlier figures have been used in FIG. 12 for similar elements. In FIG. 12, a logically layered switch is embodied, that maps a lambda and a lambda group onto a single physical plane, for example 14a/16a, 14b/16e, 14c/16I and 14d/16m. This is accomplished in a tributary card (TRIB) 200. The TRIB card 200 includes the lambda group demux 20 and lambda demuxs 24a–24d as shown in previous drawings. However the TRIB card 200 also includes 1×1 four port MEMS switches 202a–202d. The placement of these switches allows lambda plane switching (for that group) when not activated and lambda group switching when activated. For example, when 2×2 MEMS switch 202a is not activated lambda group 1 passes straight through from the input I to the output Eo to demux 24a, whose first output in input to Ei for straight through output to output O and on to lambda plane switch 16a. If lambda group 1 is to be switched, 1×1 four port MEMS switch 202a is activated and the lambda group at input I is switched to output O and onto lambda group plane 14a. However in this configuration lambda plane switch 16a and lambda group plane switch 14a are the same plane switch. Consequently the TRIB card 200 couples either a lambda to each plane in a lambda group or the lambda group to the first lambda plane in the lambda group. Also shown is an array of EDWA (Erbium Doped Waveguide Amplifiers) 204 and 205a–d similar to those discussed with regard to FIG. 3. The EDWA 204 compensates for the increased loss of the lambda group switching pathe relative to the fiber path. The EW_DWAs 205a–d compensate for the losses of the per lambda paths (the loss in 24a–d and the inverse function on the other side of the switch (not shown in FIG. 12 for simplicity)) relative to the respective lambda group.

Figure 13:
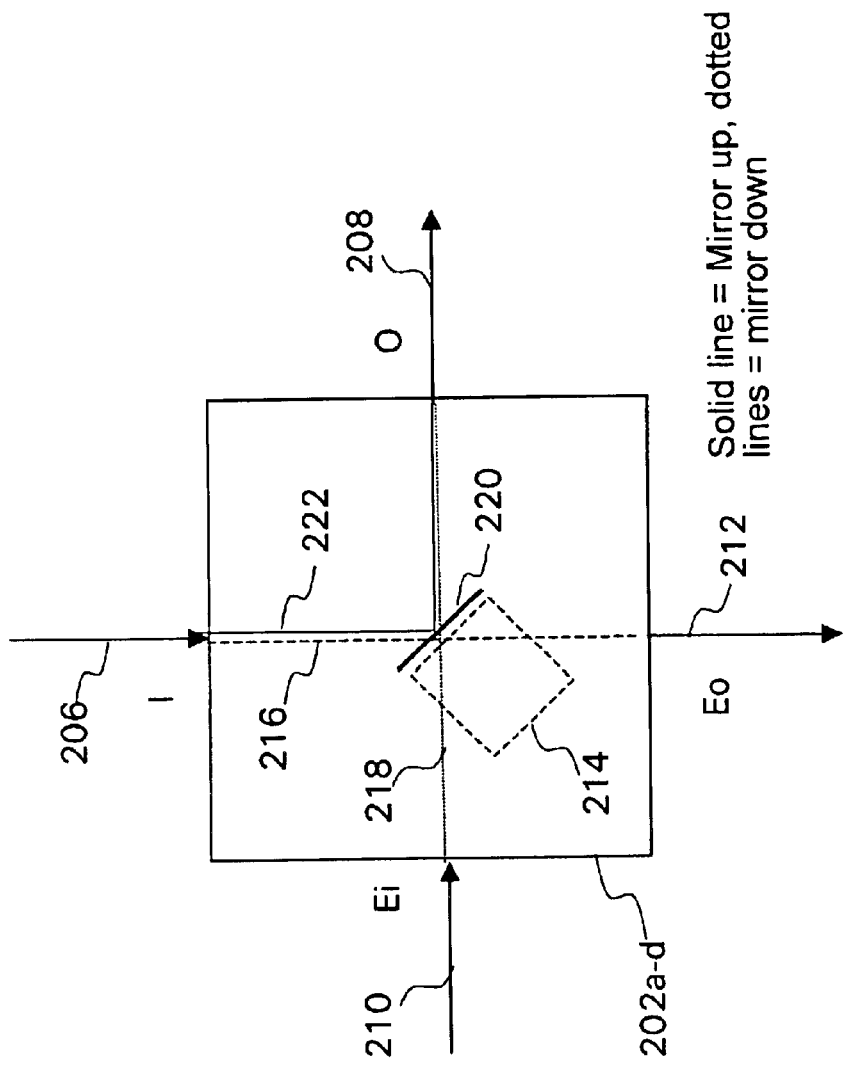
FIG. 13 illustrates in a schematic diagram the 1×1 MEMS used in the tributary card of FIG. 12.

Referring to FIG. 13 there is illustrated in a schematic diagram the 1×1 four port MEMS used in the tributary card of FIG. 12. The 1×1 four port MEMS switch 202a–d of FIG. 12 is shown in greater detail. The MEMS switch 202 includes and input I, 206; and output O, 208; and extra input Ei, 210; and an extra output. Eo, 212.

In operation, when the 1×1 four port MEMS switch 202 is not activated, its mirror lies flat on the surface as shown in broken line 214. A lambda group applied at input (I) 206 passes straight through to the output (Eo) 212 as indicated by broken line 216. This lambda group is connected to a demux 24, where it is demultiplexed into lambdas one of which (the first one is shown in FIG. 12) is applied to input (Ei) 210. The lambda travels straight through, as illustrated by broken line 218 to output (O) 208 (and on to lambda plane switch 16, not shown in FIG. 13). If the lambda group is to be switched, the 1×1 MEMS switch 202 is activated, thereby deploying the mirror as shown in solid line 220 and the lambda group at input (I) 206 is switched to output (O) 208 as shown by solid line 222 (and on to a lambda group plane 14).

Throughout this above description the terms multiplexers and demultiplexers have been used, however one of ordinary skill would recognize that between one layer and another layer, interleavers and de-interleavers could alternatively be used. For simplicity, all drawings show unidirectional paths through the plane switches, however as would be appreciated by one of ordinary skill, the optical plane switches can carry bidirectional traffic with suitable input and output components.

Modifications, variations and adaptations to the embodiments of the invention described above are possible within the scope of the invention, which is defined by the claims.

What is claimed is:

1. An optical switching system comprising:
   a first layer for switching optical channels;

a second layer for switching a group of optical channels;
a first coupler for grouping together optical channels of the first layer and coupling them to the second layer;
a second coupler for ungrouping grouped optical channels of the second layer and coupling them to the first layer; and
a third coupler for combining the grouped optical channels of the second layer.

2. An optical switching system as claimed in claim 1 wherein the optical channels are lambdas.

3. An optical switching system as claimed in claim 1 wherein the group of optical channels is a lambda group.

4. An optical switching system as claimed in claim 3 wherein the first coupler includes a multiplexer for forming a lambda group from adjacent lambdas.

5. An optical switching system as claimed in claim 3 wherein the first coupler includes an interleaver for forming a lambda group from channel separated lambdas.

6. An optical switching system as claimed in claim 3 wherein the second coupler includes a demultiplexer for forming adjacent lambdas from lambda groups.

7. An optical switching system as claimed in claim 3 wherein the first coupler includes a deinterleaver for forming channel separated lambdas from lambda groups.

8. An optical switching system as claimed in claim 1 wherein the second layer for switching grouped optical channels includes an optical plane switch.

9. An optical switching system as claimed in claim 8 wherein the optical plane switch includes a four-port MEMS.

10. An optical switching system as claimed in claim 8 wherein the optical plane switch includes a six-port MEMS.

11. An optical switching system as claimed in claim 1 wherein the first layer for switching optical channels includes a plurality of optical plane switches.

12. An optical switching system as claimed in claim 11 wherein one of the optical plane switches includes a four-port MEMS.

13. An optical switching system as claimed in claim 11 wherein one of the optical plane switch includes a six-port MEMS.

14. An optical switching system as claimed in claim 11 wherein each of the optical plane switches includes a four-port MEMS.

15. An optical switching system as claimed in claim 11 wherein each of the optical plane switches includes a six-port MEMS.

16. An optical switching system as claimed in claim 1 including a third layer for switching combined grouped optical channels.

17. An optical switching system as claimed in claim 16 wherein the third layer includes a first plurality of input ports for coupling to optical fibers.

18. An optical switching system as claimed in claim 16 wherein the third layer includes a first plurality of output ports for coupling to optical fibers.

19. An optical switching system as claimed in claim 16 wherein the second layer includes a plurality of output ports for coupling to the second coupler.

20. An optical switching system as claimed in claim 16 wherein the first layer includes a plurality of input ports for coupling to the second coupler.

21. An optical switching system as claimed in claim 16 wherein the second layer includes a plurality of input ports for coupling to the first coupler.

22. An optical switching system as claimed in claim 16 wherein the first layer includes a plurality of output ports for coupling to the first coupler.

23. An optical switching system as claimed in claim 1 wherein the first coupler includes an optical amplifier for compensation for losses within the first layer and the first coupler.

24. An optical switching system as claimed in claim 1 wherein the second coupler includes an optical amplifier for compensation for losses within the second layer and the second coupler.

25. An optical switching system comprising
a first logical layer for switching optical signals;
a second logical layer for switching a group of optical channels;
a first coupler for grouping together optical channels of the first logical layer and coupling them to the second logical layer;
a second coupler for ungrouping grouped optical channels of the second logical layer and coupling them to the first logical layer: and
a third coupler for combining grouped optical channels of the logical second layer.

26. An optical switching system as claimed in claim 25 wherein the second logical layer for switching groused optical channels includes a first optical plane switch.

27. An optical switching system as claimed in claim 26 wherein the optical plane switch includes a four-port MEMS.

28. An optical switching system as claimed in claim 26 wherein the optical plane switch includes a six-port MEMS.

29. An optical switching system as claimed in claim 26 wherein the first logical layer for switching optical channels includes a plurality of optical plane switches, one of the plurality of optical plane switches including the first optical plane switch.

30. An optical switching system as claimed in claim 25 wherein the first logical layer for switching optical channels includes a plurality of optical plane switches.

31. An optical switching system as claimed in claim 25 wherein the first coupler includes an optical amplifier for compensation for losses within the first logical layer and the first coupler.

32. An optical switching system as claimed in claim 25 wherein the second coupler includes an optical amplifier for compensation for losses within the second logical layer and the second coupler.

33. An optical switching system for switching optical signals in wavelength groups, the system comprising:
a first optical switching matrix having multiple inputs and multiple outputs and being operable to switch a composite optical signal composed of a plurality of optical channel signals from any one of a plurality of the inputs to any one of a plurality of the outputs;
at least one first wavelength division demultiplexer coupled at its input to an output of the first optical switching matrix for dividing a composite optical signal into groups of optical channel signals;
a plurality of second optical switching matrices each matrix having multiple outputs and multiple inputs at least one of which is coupled to a respective output of the first wavelength division demultiplexer, each matrix being operable to switch a group of optical channel signals from any one of a plurality of the inputs to any one of a plurality of the outputs;
at least one first wavelength division multiplexer coupled at each of its inputs to an output of a respective one of the plurality of second optical switching matrices and coupled at its output to one of the inputs of the first optical switching matrix;

a plurality of second wavelength division demultiplexers each coupled at its input to an output of a respective one of the plurality of second optical switching matrices for dividing a group of optical channel signals into optical channel signals;

a plurality of third optical switching matrices each matrix having multiple outputs and multiple inputs at least one of which is coupled to a respective output of a respective one of the plurality of second wavelength division demultiplexers, each matrix being operable to switch an optical channel signal from any one of a plurality of the inputs to anyone of a plurality of the outputs; and a plurality of second wavelength division multiplexers, each second multiplexer coupled at each of its inputs to an output of a respective one of the plurality of third optical switching matrices for combining optical channels into a group of optical channels and coupled at its output to one of the inputs of a corresponding one of the plurality of second optical switching matrices.

34. An optical switching system for switching optical signals in wavelength groups, the system comprising:

a first optical switching matrix having multiple inputs and multiple outputs and being operable to switch a composite optical signal composed of a plurality of optical channel signals from any one of a plurality of the inputs to any one of a plurality of the outputs;

at least one first wavelength division demultiplexer coupled at its input to an output of the first optical switching matrix for dividing a composite optical signal into groups of optical channel signals;

a plurality of second optical switching matrices each matrix having multiple outputs and multiple inputs, at least one of which is coupled to a respective output of the first wavelength division demultiplexer, each matrix being operable to switch a group of optical channel signals from any one of a plurality of the inputs to any one of a plurality of the outputs;

at least one first wavelength division multiplexer coupled at each of its inputs to an output of a respective one of the plurality of second optical switching matrices and coupled at its output to one of the inputs of the first optical switching matrix;

a plurality of second wavelength division demultiplexers each coupled at its input to a corresponding output of the first wavelength division demultiplexer for dividing a group of optical channel signals into optical channel signals;

at least one third wavelength division demultiplexer coupled at its input to an output of the first optical switching matrix for dividing a composite optical signal into optical channel signals;

a plurality of third optical switching matrices each matrix having multiple outputs and multiple inputs at least one of which is coupled to a respective output of a corresponding second wavelength division demultiplexer and at least one of which is coupled to a respective output of the third wavelength division demultiplexer, each matrix being operable to switch a group of optical channel signals from any one of a plurality of the inputs to any one of a plurality of the outputs;

a plurality of second wavelength division multiplexers, each multiplexer coupled at each of its inputs to an output of a respective one of the plurality of third optical switching matrices for combining optical channels into a group of optical channels and coupled at its output to one of the inputs of a corresponding one of the plurality of second optical switching matrices; and at least one third wavelength division multiplexer coupled at each of its inputs to an output of a respective one of the plurality of third optical switching matrices and coupled at its output to one of the inputs of the first optical switching matrix.

35. An optical switching system for switching optical signals in wavelength groups, the system comprising:

a first optical switching matrix having multiple inputs and multiple outputs and being operable to switch a composite optical signal composed of a plurality of optical channel signals from any one of a plurality of the inputs to any one of a plurality of the outputs;

at least one first wavelength division demultiplexer coupled at its input to an output of the first optical switching matrix for dividing a composite optical signal into groups of optical channel signals;

a plurality of second optical switching matrices each matrix having first and second inputs and first and second outputs, wherein the first input is coupled to a respective output of the first wavelength division demultiplexer, each matrix having first and second switch states, in the first state the first input is connected to the first output and in the second state the first input is connected to the second output and the second input is connected to the first output;

a plurality of second wavelength division demultiplexers each coupled at its input to the second output of a corresponding one of the plurality of second optical switching matrices for dividing a group of optical channel signals into optical channel signals;

a plurality of third optical switching matrices each matrix having multiple outputs and multiple inputs, a subset of the inputs being coupled to respective outputs of corresponding ones of the plurality of second wavelength division demultiplexers, each matrix being operable to switch a group of optical channel signals from any one of a plurality of the inputs to any one of a plurality of the outputs;

at least one first wavelength division multiplexer coupled at each of its inputs to an output of a respective one of the plurality of second optical switching matrices and coupled at its output to one of the inputs of the first optical switching matrix; and a plurality of second wavelength division multiplexers each coupled at each of its inputs to an output of a respective one of the plurality of third optical switching matrices for combining optical channels into a group of optical channels and coupled at its output to one of the inputs of a corresponding one of the plurality of second optical switching matrices.

* * * * *